US007620002B2

(12) United States Patent
Fujishima et al.

(10) Patent No.: US 7,620,002 B2
(45) Date of Patent: Nov. 17, 2009

(54) APPARATUS AND METHOD FOR CONTROLLING MULTIPLEX NUMBER IN SPATIAL DOMAIN

(75) Inventors: Kenzaburo Fujishima, Kokubunji (JP); Masanori Taira, Yokohama (JP); Mikio Kuwahara, Hachioji (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 409 days.

(21) Appl. No.: 11/386,946

(22) Filed: Mar. 23, 2006

(65) Prior Publication Data

US 2007/0115867 A1    May 24, 2007

(30) Foreign Application Priority Data

Nov. 24, 2005    (JP)    ............... 2005-338480

(51) Int. Cl.
*H04Q 7/00*    (2006.01)
(52) U.S. Cl. .................. 370/314; 370/342; 370/320; 370/335; 370/441; 375/135; 375/267
(58) Field of Classification Search .......... 370/314, 370/342; 375/267, 317, 371
See application file for complete search history.

(56) References Cited

U.S. PATENT DOCUMENTS

| 6,853,631 | B1 * | 2/2005 | Nakamura et al. | 370/342 |
|---|---|---|---|---|
| 6,977,970 | B2 * | 12/2005 | Shim et al. | 375/317 |
| 2005/0169417 | A1 * | 8/2005 | Amirichimeh et al. | 375/371 |
| 2006/0039494 | A1 * | 2/2006 | Kim et al. | 375/267 |

FOREIGN PATENT DOCUMENTS

| JP | 10-145286 | 11/1996 |
|---|---|---|
| JP | 2000-106539 | 9/1998 |
| JP | 2004-304394 | 3/2003 |

OTHER PUBLICATIONS

Widrow, B., et al., "Adaptive Antenna Systems", Proceedings of the IEEE, vol. 55, No. 12, Dec. 1967, pp. 2143-2159.
3GPP2 C.S0024-A, "cdma2000 High Rate Packet Data Air Interface Specification", Mar. 31, 2004, pp. 13-42 and 13-78.
Schmidt, Ralph O., "Multiple Emitter Location and Signal Parameter Estimation", 1986 IEEE Transactions on Antennas and Propagation, vol. AP-34, No. 3, Mar. 1986, pp. 276-280.
3GPP2, C.S0024-A, "cdma2000 High Rate Packet Data Air Interface Specification", Mar. 31, 2004, pp. 13-7 and 13-41.

* cited by examiner

*Primary Examiner*—Charles N Appiah
*Assistant Examiner*—Michael T Vu
(74) *Attorney, Agent, or Firm*—Stites & Harbison, PLLC; Juan Carlos A. Marquez, Esq.

(57) ABSTRACT

This invention provides a controller of multiplex number in spatial domain that collects from a plurality of radio communication apparatuses the number of terminals connected thereto and the multiplex number in spatial domain, determines the ratio of (the number of terminals connected thereto)/(the multiplex number in spatial domain) for each radio communication apparatus, and adjusts the multiplex number for each radio communication apparatus so that the above ratio will be equal between or among the radio communication apparatuses. The radio communication apparatuses transmit the number of terminals connected thereto and the multiplex number in spatial domain to the controller of multiplex number in spatial domain.

18 Claims, 32 Drawing Sheets

FIG.9A

| IDENTIFIER OF RADIO COMMUNICATION APPARATUS | MULTIPLEX NUMBER IN SPATIAL DOMAIN | TRAFFIC REPRESENTATIVE VALUE (THE NUMBER OF ACCESS TERMINALS) |
|---|---|---|
| 0000 | 3 | 18 |
| 0001 | 5 | 27 |
| 0002 | 2 | 6 |

FIG.9B

| IDENTIFIER OF RADIO COMMUNICATION APPARATUS | MULTIPLEX NUMBER IN SPATIAL DOMAIN | TRAFFIC REPRESENTATIVE VALUE (TOTAL THROUGHPUT) |
|---|---|---|
| 0000 | 3 | 3.4 |
| 0001 | 5 | 4.2 |
| 0002 | 2 | 1.0 |

FIG.11A

| IDENTIFIER OF RADIO COMMUNICATION APPARATUS | MULTIPLEX NUMBER IN SPATIAL DOMAIN | TRAFFIC REPRESENTATIVE VALUE (THE NUMBER OF ACCESS TERMINALS) |
|---|---|---|
| 0000 | 3 | 18 |
| 0001 | 5 | 27 |
| 0002 | 2 | 6 |

FIG.11B

| IDENTIFIER OF RADIO COMMUNICATION APPARATUS | GATHERING INFORMATION FLAG | MULTIPLEX NUMBER DECISION FLAG |
|---|---|---|
| 0000 | 1 | 1 |
| 0001 | 1 | 0 |
| 0002 | 1 | 0 |

FIG.11C

| MULTIPLEX NUMBER IN SPATIAL DOMAIN | 1 | 2 | 3 | 4 | 5 | ... |
|---|---|---|---|---|---|---|
| THE NUMBER OF ACCESS TERMINALS | 0 | 1 | 1 | 0 | 1 | ... |
| TRAFFIC REPRESENTATIVE VALUE |  | 6 | 18 |  | 27 |  |
|  |  |  |  |  |  |  |
|  |  |  |  |  |  |  |
|  | ⋮ | ⋮ | ⋮ | ⋮ | ⋮ |  |

FIG.13A

| IDENTIFIER OF RADIO COMMUNICATION APPARATUS | MULTIPLEX NUMBER IN SPATIAL DOMAIN | TRAFFIC REPRESENTATIVE VALUE (THE NUMBER OF ACCESS TERMINALS) |
|---|---|---|
| 0000 | 3 | 18 |
| 0001 | 5 | 27 |
| 0002 | 2 | 6 |

FIG.13B

| IDENTIFIER OF RADIO COMMUNICATION APPARATUS | GATHERING INFORMATION FLAG | MULTIPLEX NUMBER DECISION FLAG |
|---|---|---|
| 0000 | 1 | 1 |
| 0001 | 1 | 1 |
| 0002 | 1 | 0 |

FIG.13C

| IDENTIFIER OF RADIO COMMUNICATION APPARATUS | MULTIPLEX NUMBER IN SPATIAL DOMAIN | TRAFFIC REPRESENTATIVE VALUE (THE NUMBER OF ACCESS TERMINALS) |
|---|---|---|
| 0000 | 3 | 18 |
| 0001 | 5 | 27 |
| ⋮ | ⋮ | ⋮ |

FIG.22

| IDENTIFIER OF ACCESS TERMINAL | THE NUMBER OF BITS | BIT STREAM |
|---|---|---|
| 00000000 | 1500 | 01001011101011·············· |
| 00000001 | 2000 | 01111010101011·············· |
| 00000002 | 1000 | 10001000101110·············· |
| 00000003 | 0 | |

APPARATUS AND METHOD FOR CONTROLLING MULTIPLEX NUMBER IN SPATIAL DOMAIN

CLAIM OF PRIORITY

The present application claims priority from Japanese application JP 2005-338480 filed on Nov. 24, 2005, the content of which is hereby incorporated by reference into this application.

FIELD OF THE INVENTION

The present invention relates to base station apparatus in a radio communication system for performing spatial multiplex communication.

Recently, smart antenna technology using an array antenna has been put into practical use at base stations and access points in a radio communication system such as a mobile telephone network or wireless LAN (hereinafter, such base stations and access points will be referred to as radio communication apparatus, collectively). The principle on which the smart antenna technology operates is described, for example, in B. Widrow, et al. "Adaptive Antenna Systems," Proc. IEEE, vol. 55, No. 12, pp. 2143-2159, December. 1967. A radio communication apparatus providing for spatial multiplex communication in which a plurality of terminals share a single time and frequency channel is disclosed, for example, in Japanese Patent Application Laid-Open (JP-A) No. 2000-106539.

There is increasing demand for data communication in a radio communication system. As a packet transmission scheme for IMT-2000, a scheme called cdma 2000 1×EV-DO (Evolution Data Only) intended to increase a downlink peak transmission speed and increase throughput or the like is standardized (described, for example, in 3GPP2 C.S0024-A "cdma 2000 High Rate Packet Data Air Interface Specification" (pp. 13-42 to 13-78, 2004 Mar. 31), herein after referred to as document 1). In this high-speed packet transmission system, scheduling is performed for efficient use of limited frequency and time resources.

Scheduling for single carrier communication (which applies to 1×EV-DO) is a technique that determines how to assign a time resource for downlink communication to which terminal, and controls the order of transmission of queued data awaiting transmission in a transmit buffer. Currently, there are three typical methods of scheduling: (1) Maximum CIR, (2) Rund Robin, and (3) Proportional Fairness. In the method of (1), a terminal that communicates over a radio link of a better quality is assigned a transmission opportunity at a higher priority. The opportunities of communication of a radio communication apparatus with terminals nearer to the apparatus increase, whereas the opportunities of communication with terminals far away from the apparatus decrease. Therefore, this scheduling method results in a large disparity in service among terminals. In the method of (2), communication opportunities are evenly assigned to all terminals. As compared with the method (1), the opportunities of communication of the radio communication apparatus with terminals away from the apparatus increase and, accordingly, the throughput of the apparatus decreases. The method 3 uses a ratio of (instantaneous radio communication quality)/(average radio communication quality) as an estimation value and assigns a transmission opportunity to a terminal having a larger estimation value at a higher priority. This method provides for fair communication opportunities and better in overall efficiency than the method of (2). However, it is a challenge how to estimate the instantaneous radio communication quality per terminal correctly.

By combining spatial multiplex communication provided by the smart antenna technology with the above scheduling techniques, temporal and spatial scheduling can be provided. The temporal and spatial scheduling for single carrier communication is a technique that determines how to assign time and space resources for downlink communication to which terminal, and controls the order and space in which to transmit queued data awaiting transmission in a transmit buffer. In this relation, as the number of simultaneous transmission subchannels provided by spatial multiplexing increases, the throughput of the radio communication apparatus is enhanced.

SUMMARY OF THE INVENTION

In a radio communication system where a network is constituted by radio communication apparatuses equipped with the smart antenna technology, the present invention resolves problems associated with downlink packet communication performed by the radio communication apparatuses.

In the temporal and spatial packet scheduling scheme using the smart antenna technology, as the number of simultaneous transmission subchannels provided by spatial multiplexing per radio communication apparatus increases, the efficiency of the whole radio communication system is enhanced. On the other hand, as the number of terminals with which the radio communication apparatus communicates increases, the communication opportunities per terminal decrease. This will be explained by using FIG. 1.

FIG. 1 shows an overview of a radio communication system. A gateway 1 is a node for connection to another communication system; for example, it connects to a telecommunication network or IP network. A radio communication network 2 to which radio communication apparatuses (base station apparatuses) 4 are connected is made up of routers and cables. Geographical areas 5 are areas where communication with one of the radio communication apparatuses are possible. Directional beams 7 are those for communication with terminals 6 and spatial multiplex communication is realized by a plurality of these beams which are output at the same time.

In the example of FIG. 1, four terminals communicates with one radio communication apparatus 4-1 and two terminal communicate with another radio communication apparatus 4-2. Since the number of beams for spatial multiplex communication is assumed to be two for both radio communication apparatuses, the communication opportunities of the terminals to communicate with the radio communication apparatus 4-2 are double those of the terminals to communicate with the radio communication apparatus 4-1 by simple calculation. As a result, this system poses a problem in which disparity in communication opportunities occurs among the terminals, depending on which radio communication apparatus with which each terminal communicates. This problem further gives rise to a problem in which a radio communication apparatus giving more communication opportunities to the terminals becomes to cause excessive interference with its neighboring area by excessive spatial multiplexing communication.

These problems are resolved by controlling the number of terminals which perform simultaneous transmission by spatial multiplexing (multiplex number in spatial domain), according to the number of terminals to communicate with each radio communication apparatus. The aim of the control is to equalize the communication opportunities of the terminals which are individually connected to one of plurality of radio communication apparatuses, that is, to equalize the ratio of (the number of terminals connected thereto)/(the multiplex number in spatial domain) between or among the radio communication apparatuses.

To realize this, a controller of multiplex number in spatial domain and a plurality of radio communication apparatuses are provided, as is illustrated in FIG. 2, thereby solving the problems. The controller of multiplex number in spatial domain collects from a plurality of radio communication apparatuses the number of terminals connected thereto and the multiplex number in spatial domain, determines the ratio of (the number of terminals connected thereto)/(the multiplex number in spatial domain) for each radio communication apparatus, and adjusts the multiplex number for each radio communication apparatus so that the above ratio will be equal between or among the radio communication apparatuses. The radio communication apparatuses transmit the number of terminals connected thereto and the multiplex number in spatial domain to the controller of multiplex number in spatial domain.

In FIG. 2, in one area (cell) 5-1, there are four terminals 6 and the multiplex number in spatial domain (the number of directional beams that are used at the same timing) of one radio communication apparatus 4-1 is two. In another area 5-2, there are two terminals 6 and the multiplex number in spatial domain of another radio communication apparatus 4-2 is one.

The present invention decreases disparity in communication opportunities among terminals, occurring between radio communication apparatuses, and disparity in terminal throughputs between radio communication apparatuses. In consequence, the invention can provide a radio communication system with less disparity in services among terminals. The present invention reduces multiplex number of a radio communication apparatus that provides a superfluous service in comparison with other radio communication apparatuses and, therefore, can reduce interference of the radio communication apparatus with a neighboring area, and improves the quality of communication of terminals communicating with a radio communication apparatus which is located within the neighboring area as its geographical coverage.

BRIEF DESCRIPTION OF THE DRAWINGS

FIGS. 9A and 9B provide examples of formats of information recorded into a traffic record unit.

FIGS. 11A, 11B, and 11C provide examples of records which are stored into a buffer for calculation in the traffic evaluation unit.

FIGS. 13A, 13B, and 13C provide examples of records which are stored into a buffer for calculation in the multiplex number decision unit.

FIG. 22 illustrates a format of data recorded in a down link data buffer of a data record unit.

DETAILED DESCRIPTION OF THE PREFERRED EMBODIMENTS

Figure 1:
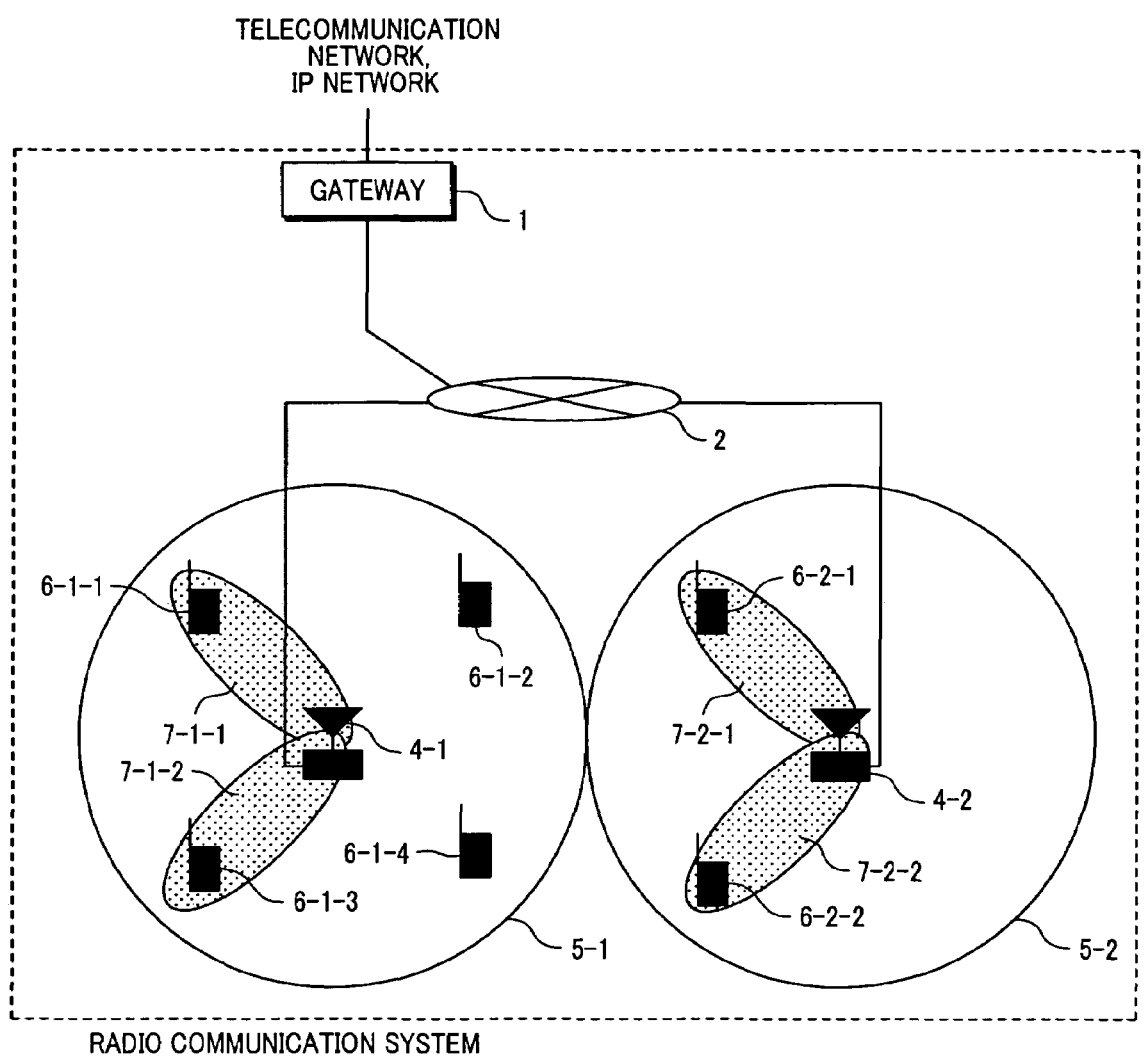
FIG. 1 shows a diagram of a radio communication system.
Figure 2:
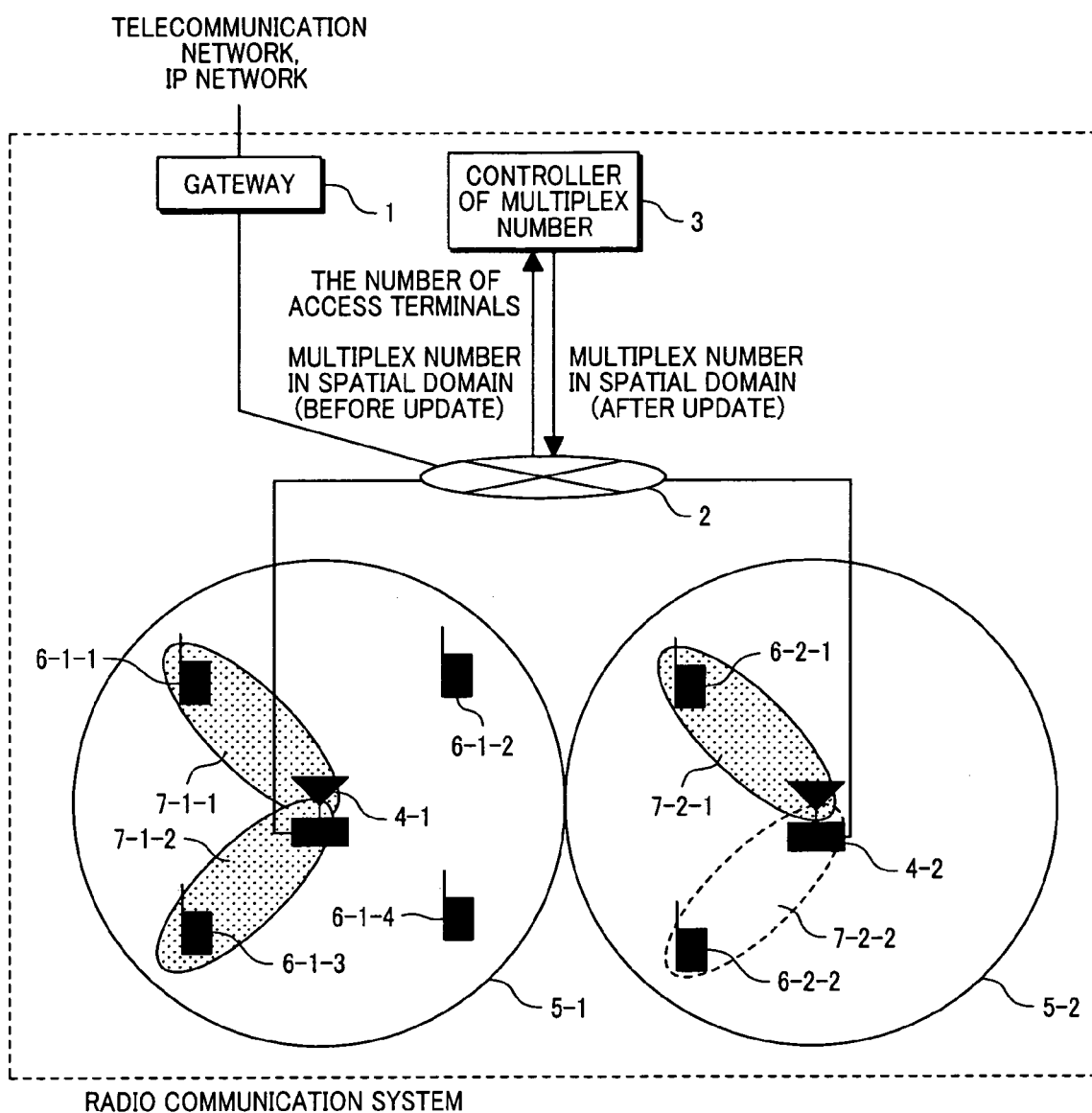
FIG. 2 illustrates a radio communication system in which the present invention is effected.
Figure 3:
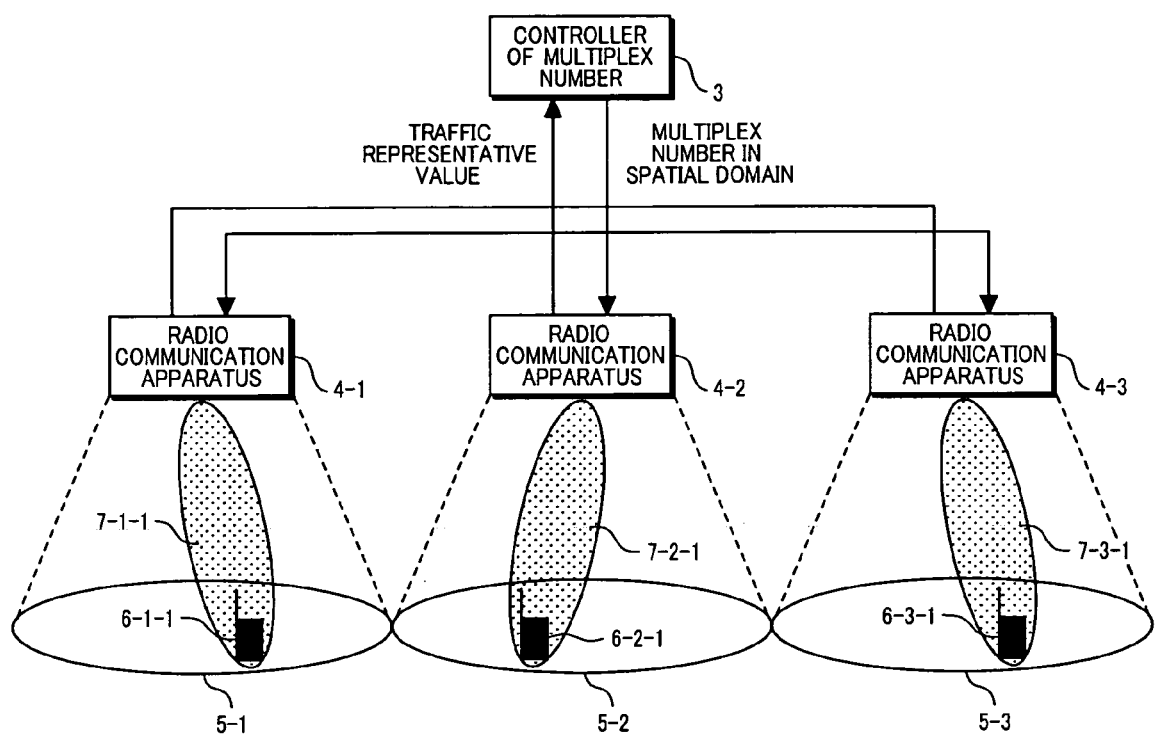
FIG. 3 illustrates a first embodiment of a system configuration according to the present invention.

FIG. 3 illustrates an example of a configuration of the present invention. A controller 3 of multiplex number in spatial domain is connected to a plurality of radio communication apparatuses 4 via a network and takes a role of collecting a traffic representative value (for example, the number of connected terminals or throughput which will be detailed later) from each radio communication apparatus 4, evaluating a plurality of traffic representative values collected, determining the multiplex number in spatial domain for each radio communication apparatus 4, and notifying each radio communication apparatus 4 of the multiplex number in spatial domain.

The radio communication apparatuses 4 transmit downlink signals to terminals 6, respectively, falling within geographical areas 5, using directional beams 7. The directional beams 7 as many as the multiplex number in spatial domain specified from the controller 3 of multiplex number in spatial domain are multiplexed and output, thereby spatial multiplex transmission to a plurality of terminals is performed. To allow the in spatial domain to specify the multiplex number in spatial domain, each radio communication apparatus 4 observes downlink signals thereto, determines the traffic representative value, and transmits it to the controller 3 of multiplex number in spatial domain.

Figure 4:
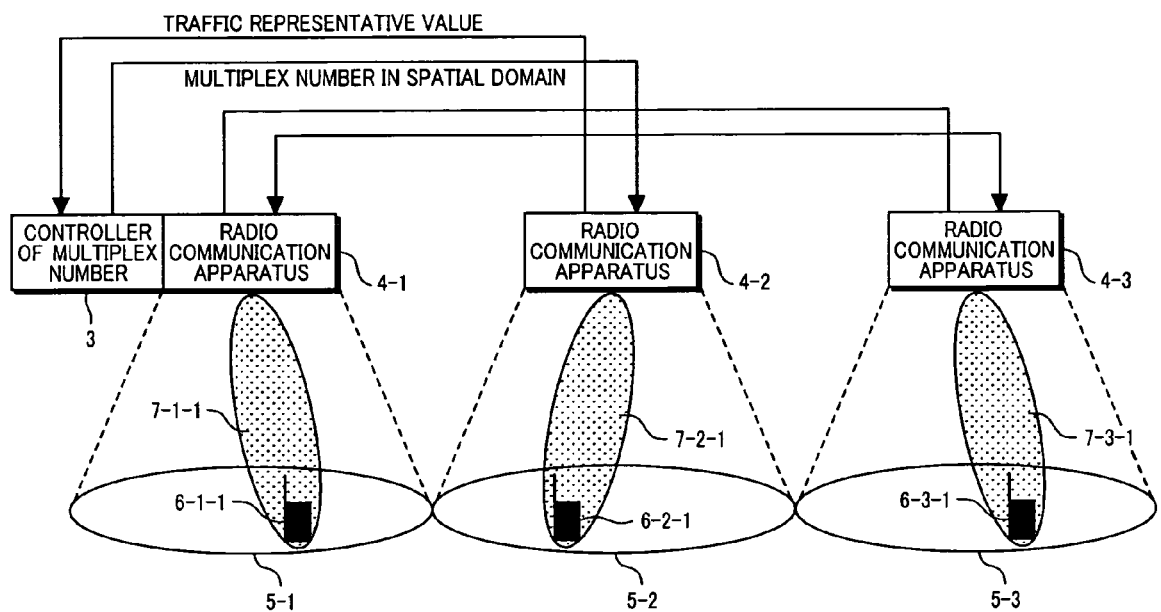
FIG. 4 illustrates a modification to the first embodiment of the system configuration according to the present invention.

This embodiment assumes that the controller 3 of multiplex number in spatial domain and the radio communication apparatuses 4 are located in geographically distant places. However, the controller 3 of multiplex number in spatial domain may be integrated into one of the radio communication apparatuses 4, as is shown in FIG. 4, which does not alter the effect of the present invention.

Figure 5:
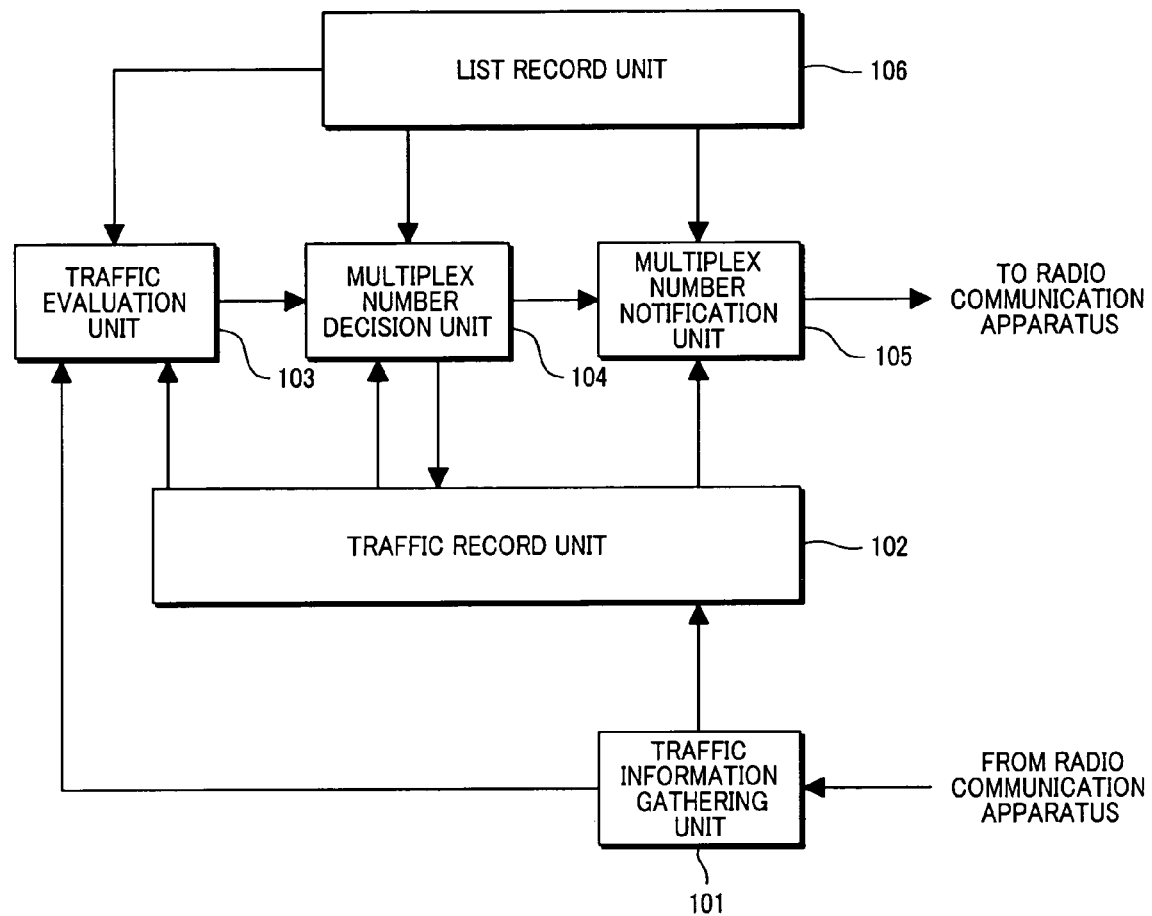
FIG. 5 illustrates a first configuration example of a controller of multiplex number in spatial domain.

FIG. 5 illustrates an example of the controller of multiplex number in spatial domain that controls the multiplex number of each radio communication apparatus, referring to the traffic representative values from the plurality of radio communication apparatuses.

A traffic information gathering unit 101 receives the values of the multiplex number in spatial domain, traffic representative values, and sender apparatus Identifiers sent from the plurality of radio communication apparatuses and records them into a traffic record unit 102. Upon the completion of the recording, the traffic information gathering unit 101 notifies a traffic evaluation unit 103 of the completion of recording.

Figure 6:
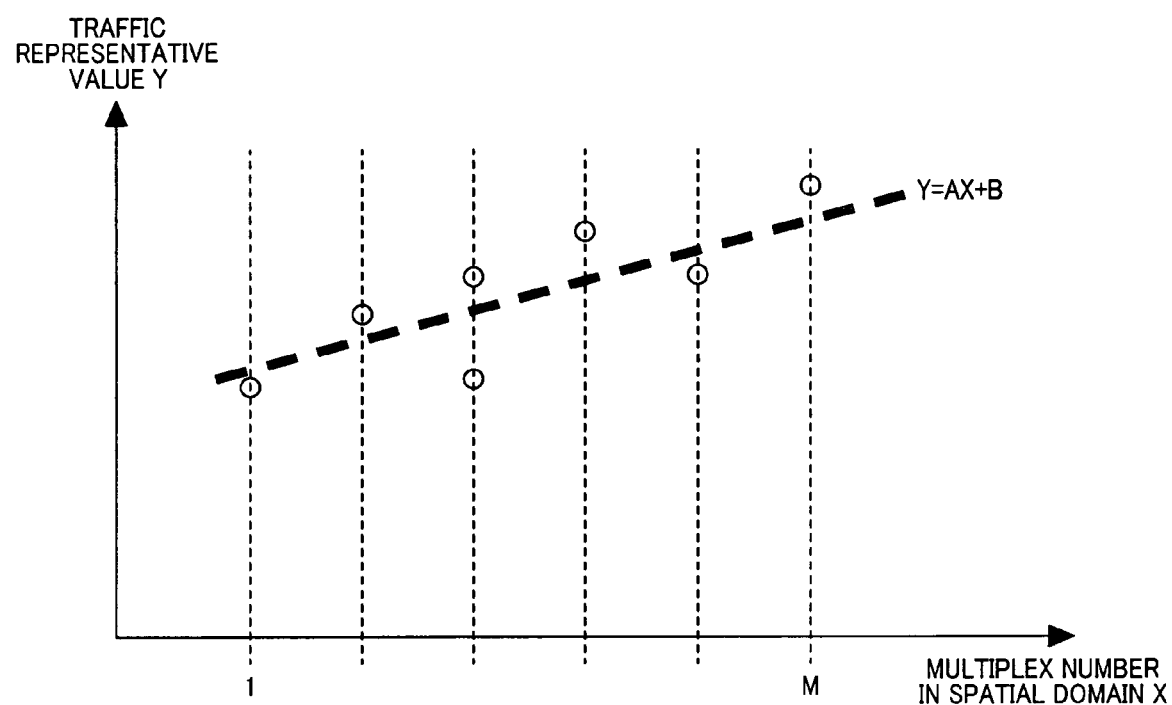
FIG. 6 shows a linear approximation of the relationship between traffic representative value and multiplex number in spatial domain.

The traffic evaluation unit 103 is activated by receiving the notification of the completion of recording from the traffic information gathering unit 101. After being activated, the traffic evaluation unit 103 reads the values of the multiplex number in spatial domain and the traffic representative values of the specified radio communication apparatuses from the traffic record unit 102 and plots these values on a graph of multiplex number in spatial domain (X) versus traffic representative value (Y) per radio communication apparatus, as is shown in FIG. 6. Then, the traffic evaluation unit 103 obtains a linear approximation (Y=AX+B) to minimize the sum of squared errors for all plotted points. After obtaining the linear approximation, the traffic evaluation unit 103 notifies a multiplex number decision unit 104 of the parameters (A, B) of the obtained linear approximation and the linear approximation complete. Incidentally, the condition for the specified radio communication apparatuses for reading the values of the multiplex number in spatial domain and traffic representative values from the traffic record unit 102 is that the radio communication apparatuses are those apparatuses from which the controller of multiplex number in spatial domain collects the traffic representative values. The traffic evaluation unit 103 determines whether the condition is applicable by referring to the flag of each radio communication apparatus recorded in a list record unit 106.

The multiplex number decision unit 104 is activated by receiving the notification of the approximation complete from the traffic evaluation unit 103. After being activated, the multiplex number decision unit 104 reads the values of the multiplex number in spatial domain and the traffic representative values of the specified radio communication apparatus from the traffic record unit 102 and compares the read values with the approximation line notified from the traffic evaluation unit 103. The method of the comparison will be described later. As a result of the comparison, the multiplex number decision unit 104 determines the values of the multiplex number in spatial domain for the specified radio communication apparatuses and overwrites the values of the multiplex number in spatial domain recorded in the traffic record unit 102 with the determined values of the multiplex number. Upon the completion of the overwrite, the multiplex number decision unit 104 notifies a multiplex number notification unit 105 that the values of the multiplex number in spatial domain recorded in the traffic record unit 102 have been updated. Incidentally, the condition for the specified radio communication apparatuses for reading the values of the multiplex number in spatial domain from the traffic record unit 102 is that the radio communication apparatuses are those apparatuses for which the controller of multiplex number in spatial domain controls the multiplex number thereof. The multiplex number decision unit 104 determines whether the condition is applicable by referring to the flag of each radio communication apparatus recorded in the list record unit 106.

The multiplex number notification unit 105 is activated by receiving the notification of the update complete from the multiplex number decision unit 104. After being activated, the multiplex number notification unit 105 reads the values of the multiplex number in spatial domain of the specified radio communication apparatuses from the traffic record unit 120 and notifies the specified radio communication apparatuses of their values of the multiplex number in spatial domain, respectively. Incidentally, the condition for the specified radio communication apparatuses for reading the values of the multiplex number in spatial domain and traffic representative values from the traffic record unit 102 is that the radio communication apparatuses are those apparatuses for which the controller of multiplex number in spatial domain controls the values of the multiplex number thereof. The multiplex number notification unit 105 determines whether the condition is applicable by referring to the flag of each radio communication apparatus recorded in the list record unit 106.

In the above controller of multiplex number in spatial domain, the traffic record unit 102 and the list record unit 106 can be realized by a memory, the traffic evaluation unit 103 and the multiplex number decision unit 104 can be realized by a processing device such as a CPU or a DSP, and the traffic information gathering unit 101 and the multiplex number notification unit 105 can be realized by a processing device with a network adapter for controlling transmission and reception.

Figure 7:
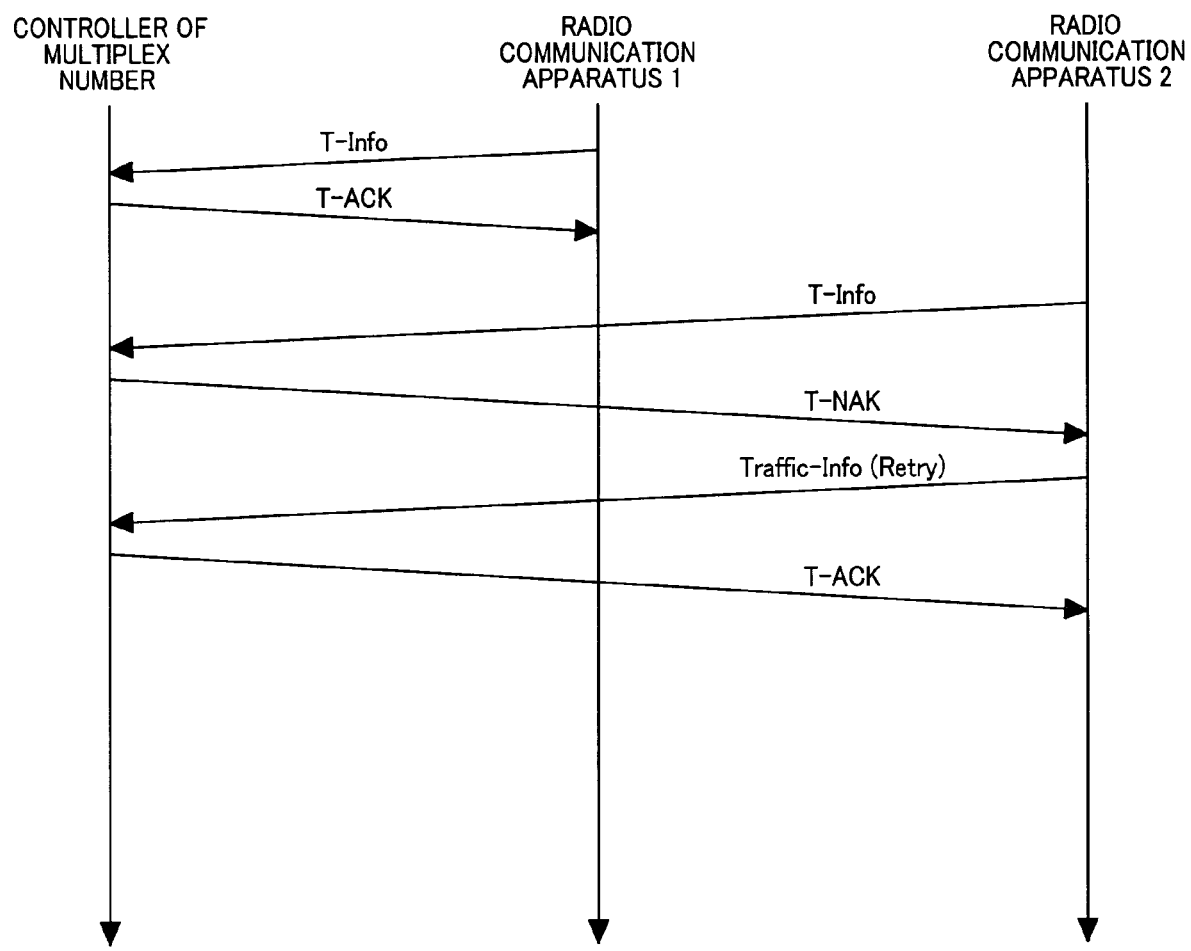
FIG. 7 illustrates a sequence of exchange of messages when radio communication apparatuses transmit traffic representative values.

FIG. 7 is a diagram of sequence of exchange of messages when the radio communications apparatuses report representative values to the controller of multiplex number in spatial domain. First, a radio communication apparatus transmits a traffic information message (Traffic Information, T-info) conveying the multiplex number in spatial domain, traffic representative value, and its apparatus Identifier to the controller of multiplex number in spatial domain. This message is received by the traffic information gathering unit 101 and checked for an error by, for example, a parity check. If the message is not in error, the traffic information gathering unit 101 returns ACK (T-Info Acknowledgement, T-ACK) to the sender apparatus, as in an example of a reply message to radio communication apparatus 1, and records the received traffic representative value into the traffic record unit 102. If the message is in error, the traffic information gathering unit 101 returns NAK (T-Info No ACK, T-NAK) to the sender apparatus, as in an example of a reply message to radio communication apparatus 2, and calls on the sender apparatus to retransmit the traffic information message (T-Info). The sender apparatus repeats retransmission of the T-info message until T-ACK is returned from the traffic information gathering unit 101. After returning T-ACK, the traffic information gathering unit 101 records the received traffic representative value and other information into the traffic record unit 102.

Figure 8:
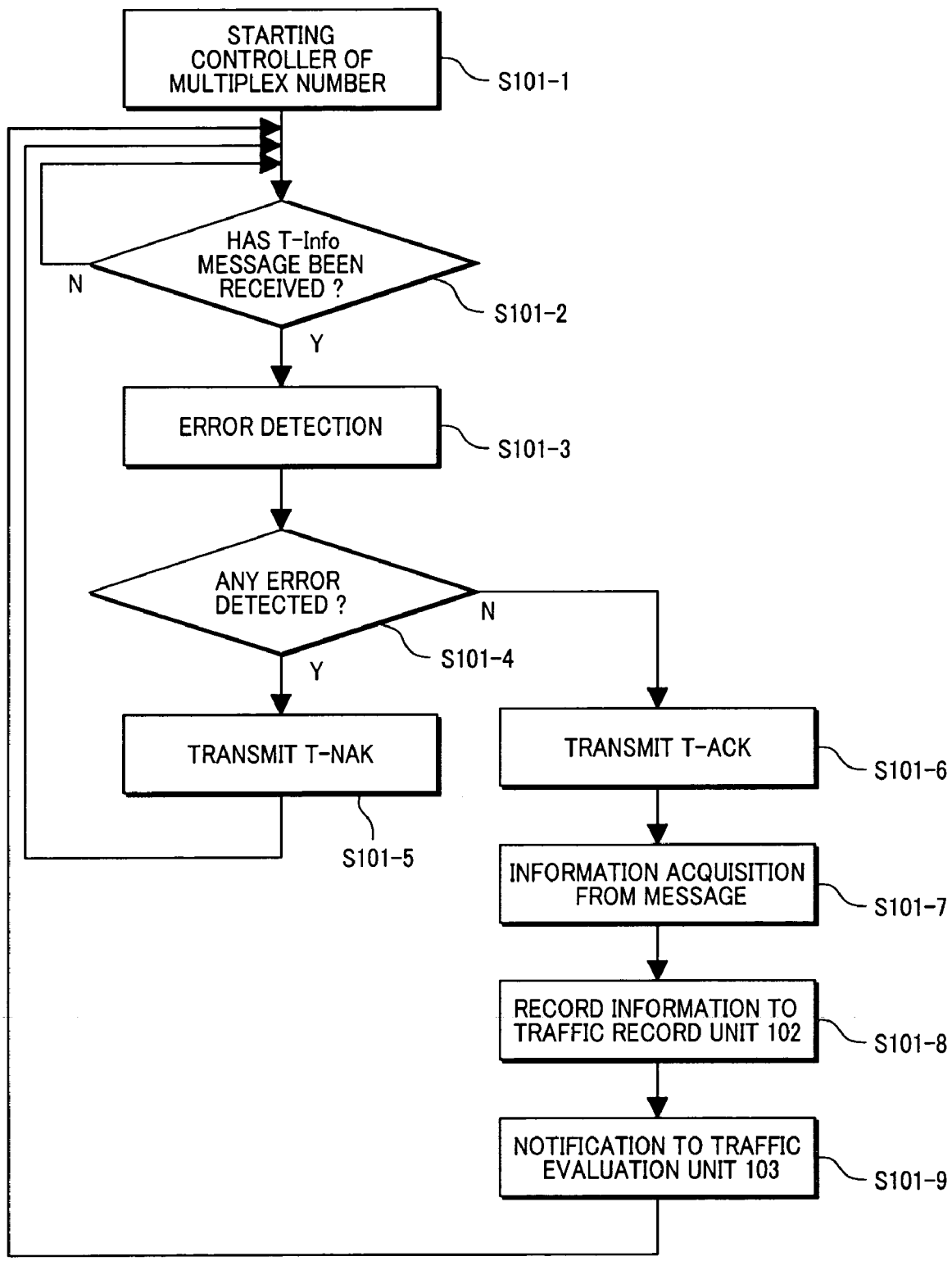
FIG. 8 is a flowchart of operation of a traffic information gathering unit.

FIG. 8 shows a flowchart of operation of the traffic information gathering unit 101. Upon the startup of the controller of multiplex number in spatial domain (S101-1), initially, the traffic information gathering unit 101 waits for a T-Info message from a radio communication apparatus (S101-2). Upon receiving the T-Info, the traffic information gathering unit 101 detects for errors in the received message (S101-3). If it is determined that the message is in error (S101-4), the traffic information gathering unit 101 calls on the sender apparatus to retransmit T-Info (S101-5). If the message is not in error, the traffic information gathering unit 101 returns T-ACK to the sender apparatus (S101-6), retrieves information (the multiplex number in spatial domain of the apparatus, traffic representative value, and apparatus Identifier) from the T-Info message (S101-7), and stores that information into the traffic record unit 102 (S101-8). Upon the completion of the recording, the traffic information gathering unit 101 triggers the traffic evaluation unit 103 to signify that the recording is complete (S101-9).

FIG. 9 provides examples of information recorded into the traffic record unit 102. FIG. 9A provides examples of records when the number of access terminals (terminals accommodated by each radio communication apparatus) is recorded as a traffic representative value. After the traffic information gathering unit 101 receives the T-Info message and returns the T-ACK, it records the multiplex number of the radio communication apparatus, traffic representative value, and the identifier of the sender apparatus of the T-Info message as a set of related attributes into the traffic record unit 102. Here, the traffic representative value is the number of connected terminals communicating with each radio communication apparatus. Reference to the information thus recorded is made by the traffic evaluation unit 103, multiplex number decision unit 104, and multiplex number notification unit 105, selecting each record for each apparatus identifier. Furthermore, the multiplex number decision unit 104 overwrites the entry of multiplex number with a newly determined multiplex number in spatial domain.

FIG. 9B provides examples of records when the total throughput [Mbps] of each radio communication apparatus is recorded as a traffic representative value. These records are used in the same way as for the records in FIG. 9A within the controller of multiplex number in spatial domain. The traffic representative value gives an indication of how much resources for communication are required by each radio communication apparatus. If the traffic representative value is the number of connected terminals, as in FIG. 9A, it becomes easy to acquire the traffic representative value. If the traffic representative value is the total throughput, as in FIG. 9B, the value that reflects actual traffic more precisely is obtained.

Figure 10:
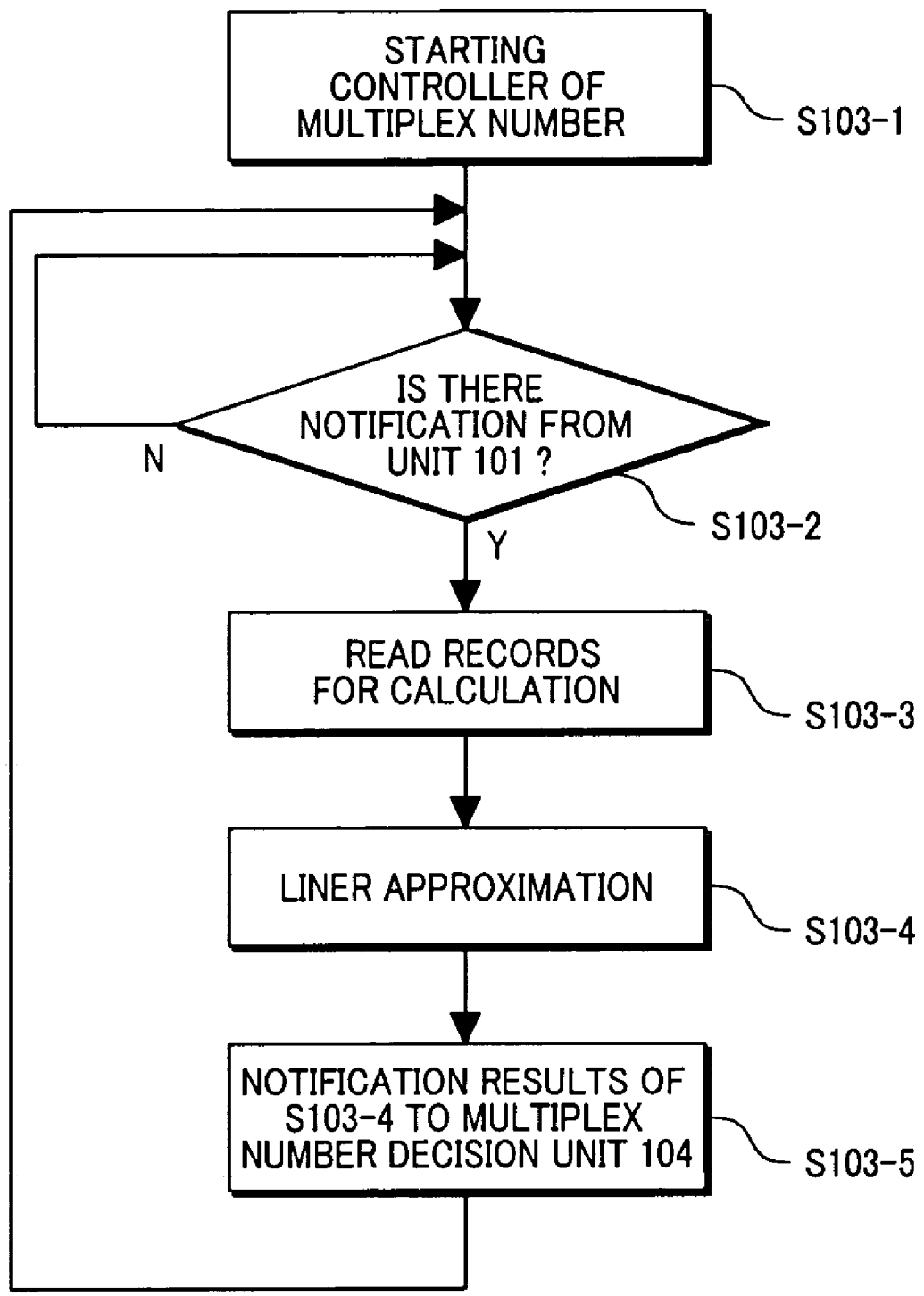
FIG. 10 is a flowchart of operation of a traffic evaluation unit.

FIG. 10 shows a flowchart of operation of the traffic evaluation unit 103. Upon the startup of the controller of multiplex number in spatial domain (S103-1), initially, the traffic evaluation unit 103 waits for a trigger from the traffic information gathering unit 101 (S103-2). Upon receiving the trigger, the traffic evaluation unit 103 reads the values of multiplex numbers and the traffic representative values of the specified radio communication apparatuses from the traffic record unit 102 and copies them to a buffer for calculation (S103-3).

How to copy to the buffer for calculation is described with FIG. 11. FIG. 11A provides examples of records held in the traffic record unit 102, which are the same as provided in FIG. 9A. FIG. 11B provides examples of flags of the radio communication apparatuses, recorded in the list record unit 106. The controller of multiplex number in spatial domain acquires information such as traffic representative values from the radio communication apparatuses with a gathering information flag of 1 and determines the multiplex number for the radio communication apparatuses with a multiplex number decision flag of 1. At step S103-3 in FIG. 10, the traffic evaluation unit 103 copies the information of the radio communication apparatuses with the gathering information flag of 1 from the records shown in FIG. 11A to the buffer for calculation. As a result, the traffic representative values regarding all radio communication apparatuses, gathered by the controller of multiplex number in spatial domain can be evaluated. FIG. 11C shows the information copied to the buffer for calculation. The traffic evaluation unit 103 counts the number of radio communication apparatuses by each value of the multiplex numbers they have and records all traffic representative values respectively for each value of the multiplex numbers.

After finishing step S103-3 in FIG. 10, the traffic evaluation unit 103 calculates A and B in equation 1 for a linear approximation from the records in the buffer for calculation (S103-4). In equation 1, A is a proportionality coefficient between the multiplex numbers and the traffic representative value, B is an offset value, X is multiplex number, and Y is the traffic representative value. Specifically, it calculates A and B that minimize a squared error value which is obtained by equation 2, where x is a counter of the multiplex number, n is a counter of the number of radio communication apparatuses, M is the maximum multiplex number, and N(x) is the number of radio communication apparatuses by each value of the multiplex numbers x. N(x) corresponds to a value in the second row from top in FIG. 11C and n corresponds to the n-th row of the traffic representative value records in FIG. 11C. y (x, n) represents a traffic representative value in the x column of the multiplex numbers and in the n-th row of the traffic representative value records.

$$Y = AX + B \qquad \text{[Equation 1]}$$

$$E^2(A, B) = \sum_{x=1}^{M} \sum_{n=1}^{N(x)} |y(x, n) - (Ax + B)|^2 \qquad \text{[Equation 2]}$$

After finishing the calculation for the linear approximation (S103-4), the traffic evaluation unit 103 notifies the multiplex number decision unit 104 of the calculation complete and the parameters (A, B) of the approximation line (S103-5).

Figure 12:
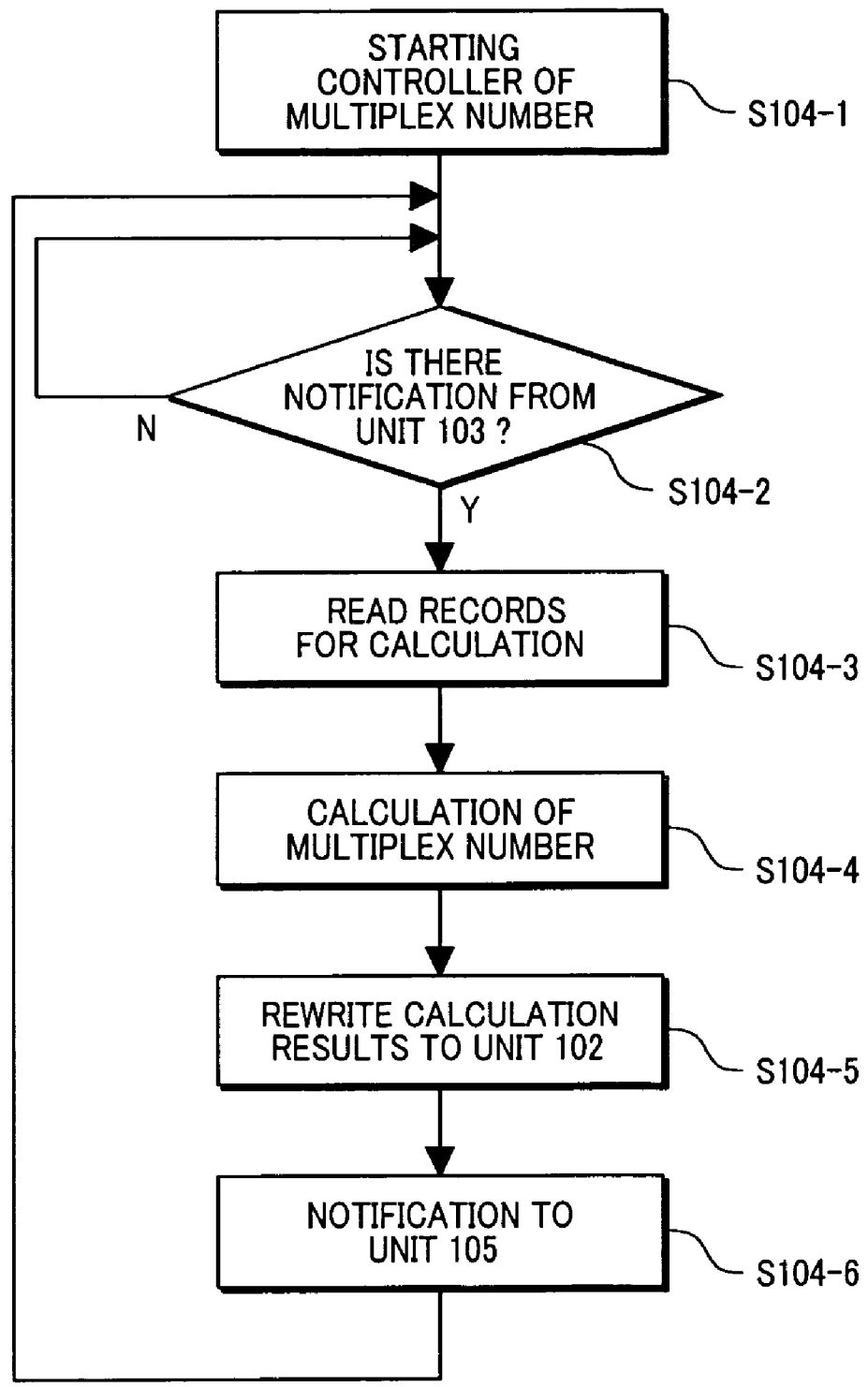
FIG. 12 is a flowchart of operation of a multiplex number decision unit.

FIG. 12 shows a flowchart of operation of the multiplex number decision unit 104.

Upon the startup of the controller of multiplex number in spatial domain (S104-1), initially, the multiplex number decision unit 104 waits for a trigger from the traffic evaluation unit 103 (S104-2). Upon receiving the trigger, the multiplex number decision unit 104 reads the values of the multiplex numbers and the traffic representative values of the specified radio communication apparatuses from the traffic record unit 102 and copies them to a buffer for calculation (S104-3).

The method of copying to the buffer for calculation is described with FIG. 13. FIGS. 13A and 13B are the same as the FIGS. 11A and 11B and explanation is not repeated here. FIG. 13C shows the records copied to the buffer for calculation, which are the extracts of records in the rows in FIG. 13A corresponding to the radio communication apparatuses with the multiplex number decision flag of 1 in FIG. 13B (S104-3).

For each of the radio communication apparatuses extracted, the multiplex number decision unit 104 evaluates whether the traffic representative value is too large or small in relation to the multiplex numbers and recalculates the multiplex numbers (S104-4). Two methods of recalculation are available.

Figure 14:
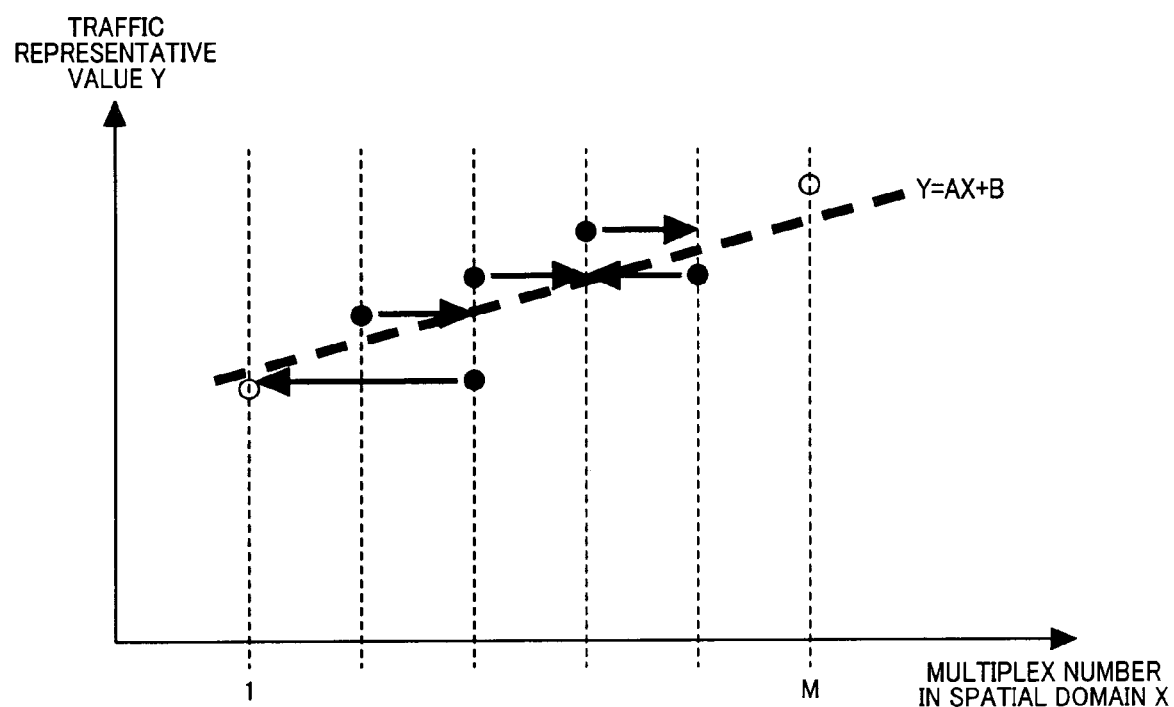
FIG. 14 illustrates a method of determining multiplex number to fit the multiplex number of a radio communication apparatus to an approximation straight line.
Figure 15:
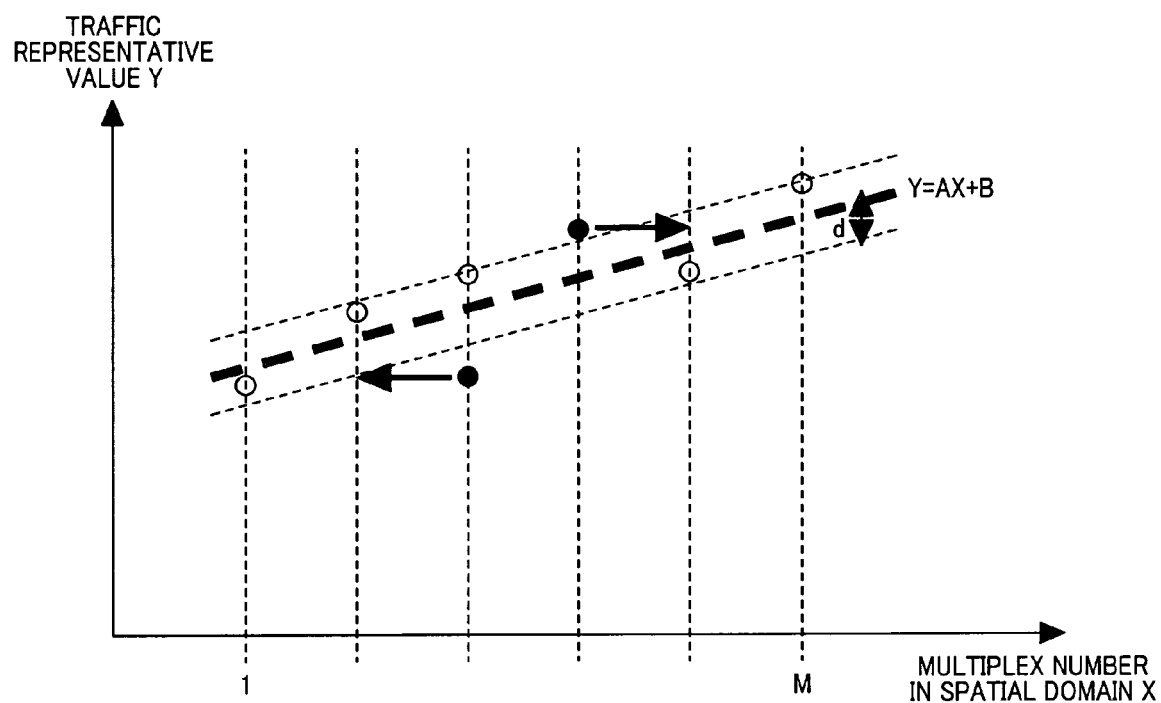
FIG. 15 illustrates a method of determining multiplex number to moderately adjust the multiplex number of the radio communication apparatus.

One method is to compare the traffic representative value of the radio communication apparatus with the linear approximation and directly specify the multiplex numbers X corresponding to the traffic value with the least error from the approximation line, as is illustrated in FIG. 14. The other method is to increment or decrement by one the multiplex numbers of the radio communication apparatus, if the traffic representative value of the apparatus in relation to the multiplex numbers thereof is displaced from the linear approximation by a threshold displacement (d) or more, as is illustrated in FIG. 15.

After finishing the recalculation, the multiplex number decision unit 104 overwrites the multiplex numbers of each radio communication apparatus in the traffic record unit 102 (S104-5) and notifies the multiplex number notification unit 105 that the values of the multiplex numbers have bee updated (S104-6).

Figure 16:
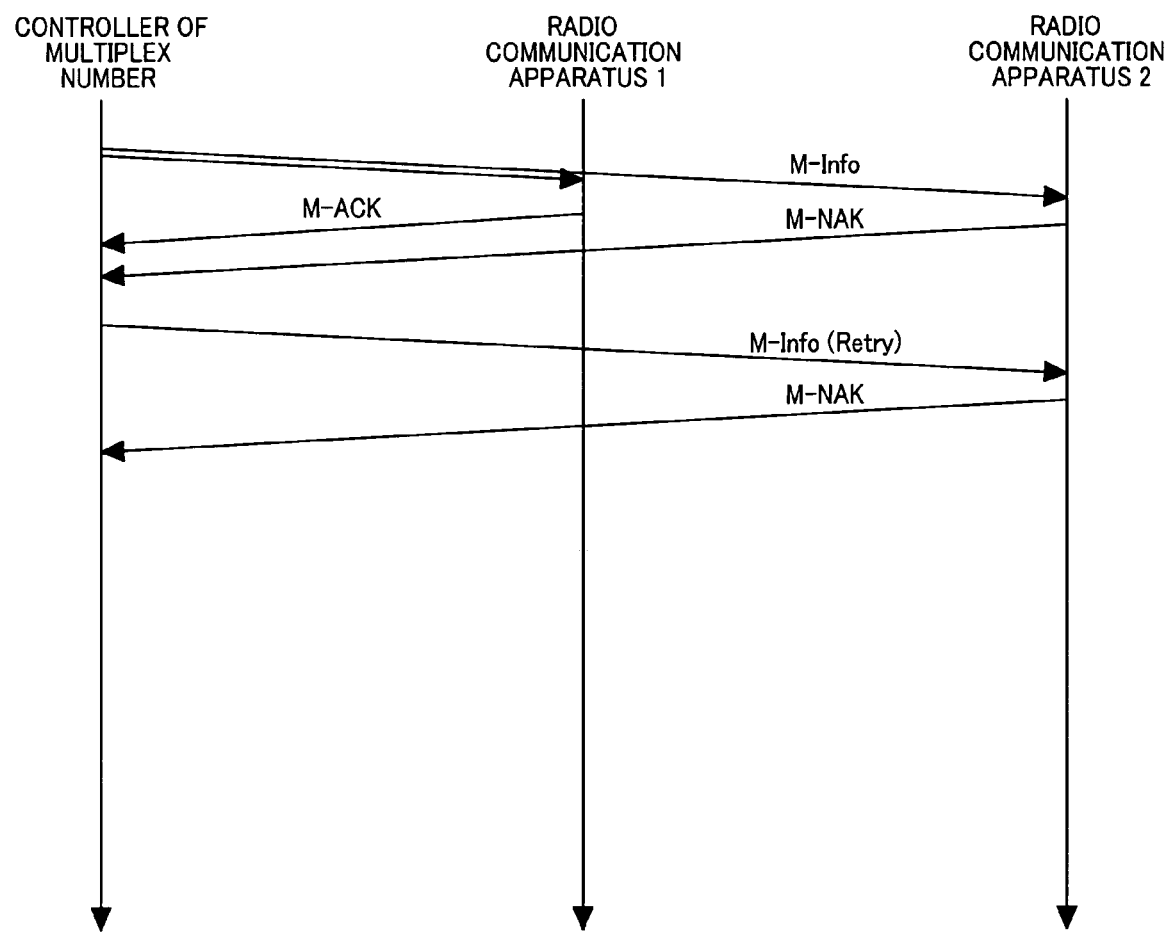
FIG. 16 illustrates a sequence of exchange of messages when the controller of multiplex number in spatial domain transmits the values of multiplex number.

FIG. 16 is a diagram of sequence of exchange of messages when the controller of multiplex number in spatial domain notifies the radio communication apparatuses of the values of the multiplex numbers.

First, the multiplex number notification unit 105 of the controller of multiplex number in spatial domain transmits multiplex number notification messages (Multiplex Information, M-Info) conveying each value of the multiplex numbers to the radio communication apparatuses. These messages are received by the radio communication apparatuses and checked for an error by, for example, a parity check. If the message is not in error, the radio communication apparatus returns ACK (M-Info ACK, M-ACK) to the sender controller of multiplex number in spatial domain, as in an example of a reply from radio communication apparatus 1. If the message is in error, the radio communication apparatus returns NAK (M-Info NAK, M-NAK) to the sender controller of multiplex number in spatial domain, as in an example of a reply from radio communication apparatus 2. The multiplex number notification unit 105 repeats retransmission until M-ACL receives from the radio communication apparatus.

Figure 17:
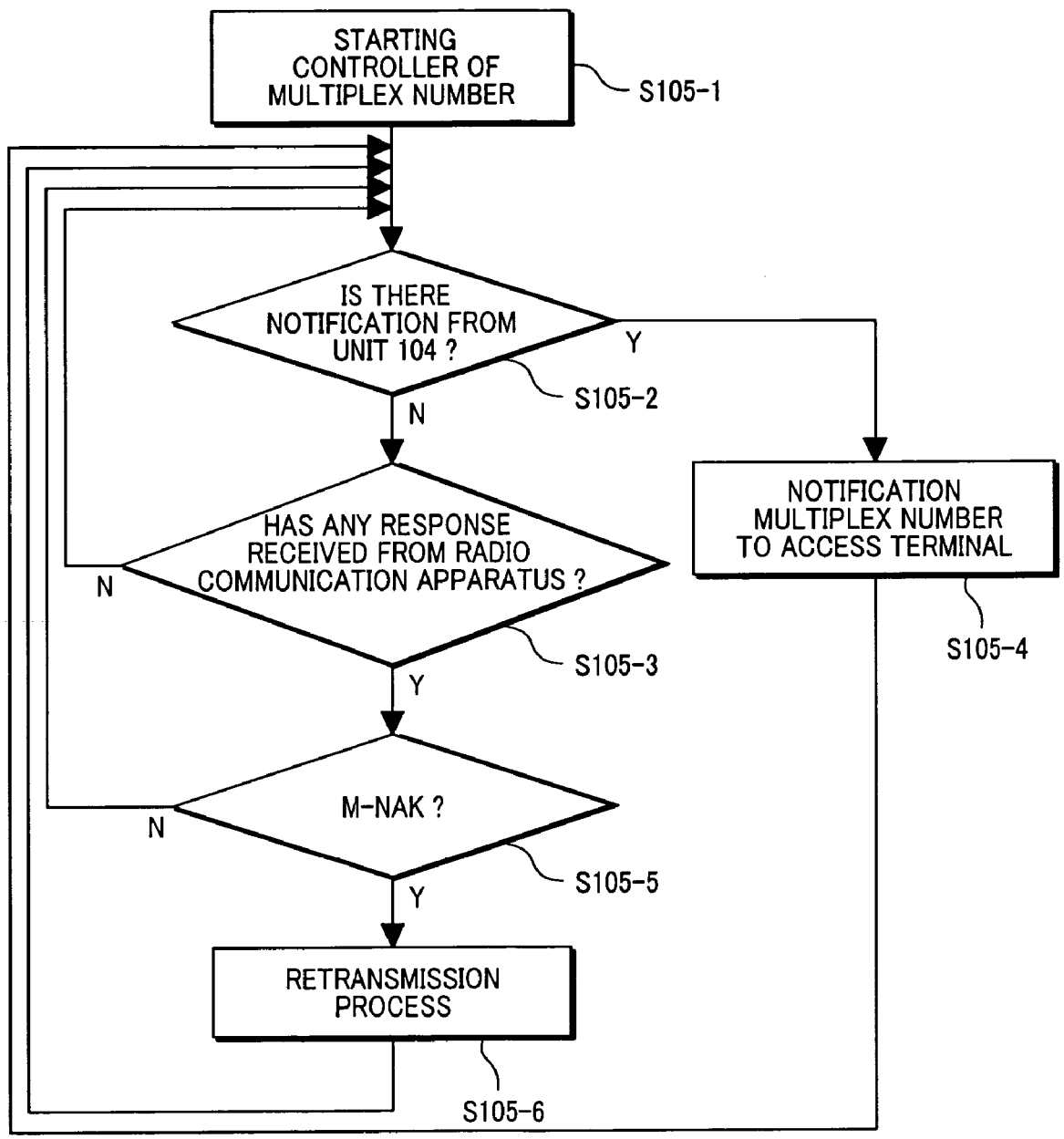
FIG. 17 is a flowchart of operation of a multiplex number notification unit.

FIG. 17 shows a flowchart of operation of the multiplex number notification unit 105. Upon the startup of the controller of multiplex number in spatial domain (S105-1), initially, the multiplex number notification unit 105 waits for a trigger from the multiplex number decision unit 104 (S105-2) or waits for a reply to an M-Info message from a radio communication apparatus (S105-3). When the multiplex number notification unit 105 receives the trigger from the multiplex number decision unit 104, it notifies the specified radio communication apparatuses of the values of the multiplex numbers. This notification is transmitted to those radio communication apparatuses with the multiplex number decision flag of 1 with reference to the records held in the list record unit 106 (for example, FIG. 13B). To these apparatuses, the M-Info messages conveying each value of the multiplex numbers, recorded in the traffic record unit 102, are transmitted (S105-4). When the multiplex number notification unit 105 receives a reply to a M-info message from a radio communication apparatus, it determines whether the message is M-NAK (S105-5). If the message is M-NAK, the multiplex number notification unit 105 retransmits an M-Info message to the radio communication apparatus (S105-6).

Figure 18:
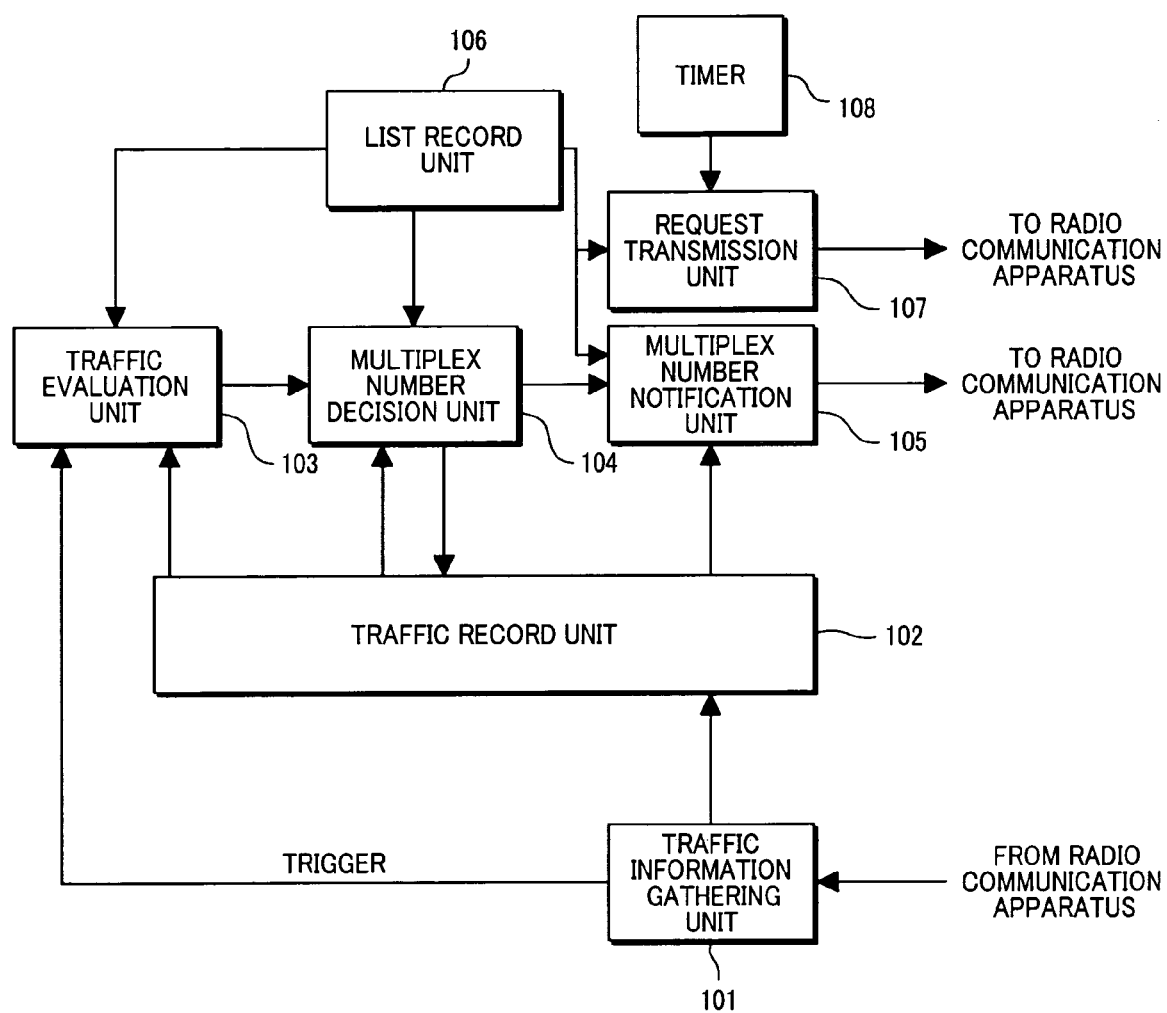
FIG. 18 illustrates a second configuration example of the controller of multiplex number in spatial domain.

FIG. 18 illustrates another example of a configuration of the controller of multiplex number in spatial domain. In this configuration, a request transmission unit 107 and a timer 108 are added to the foregoing configuration example.

The request transmission unit 107 is activated by receiving a trigger from the timer 108. After being activated, the request transmission unit 107 transmits messages requesting the specified radio communication apparatuses to transmit their traffic representative values to the controller of multiplex number in spatial domain. When transmitting the messages, the request transmission unit 107 transmits Request messages which have been arranged with the radio communication apparatuses beforehand. Incidentally, the condition for the specified radio communication apparatuses to which the request messages should be transmitted is that they are those apparatuses for which the controller of multiplex number in spatial domain controls the multiplex number thereof. The request transmission unit 107 determines whether the condition is applicable by referring to the flag of each radio communication apparatus recorded in the list record unit 106.

Figure 19:
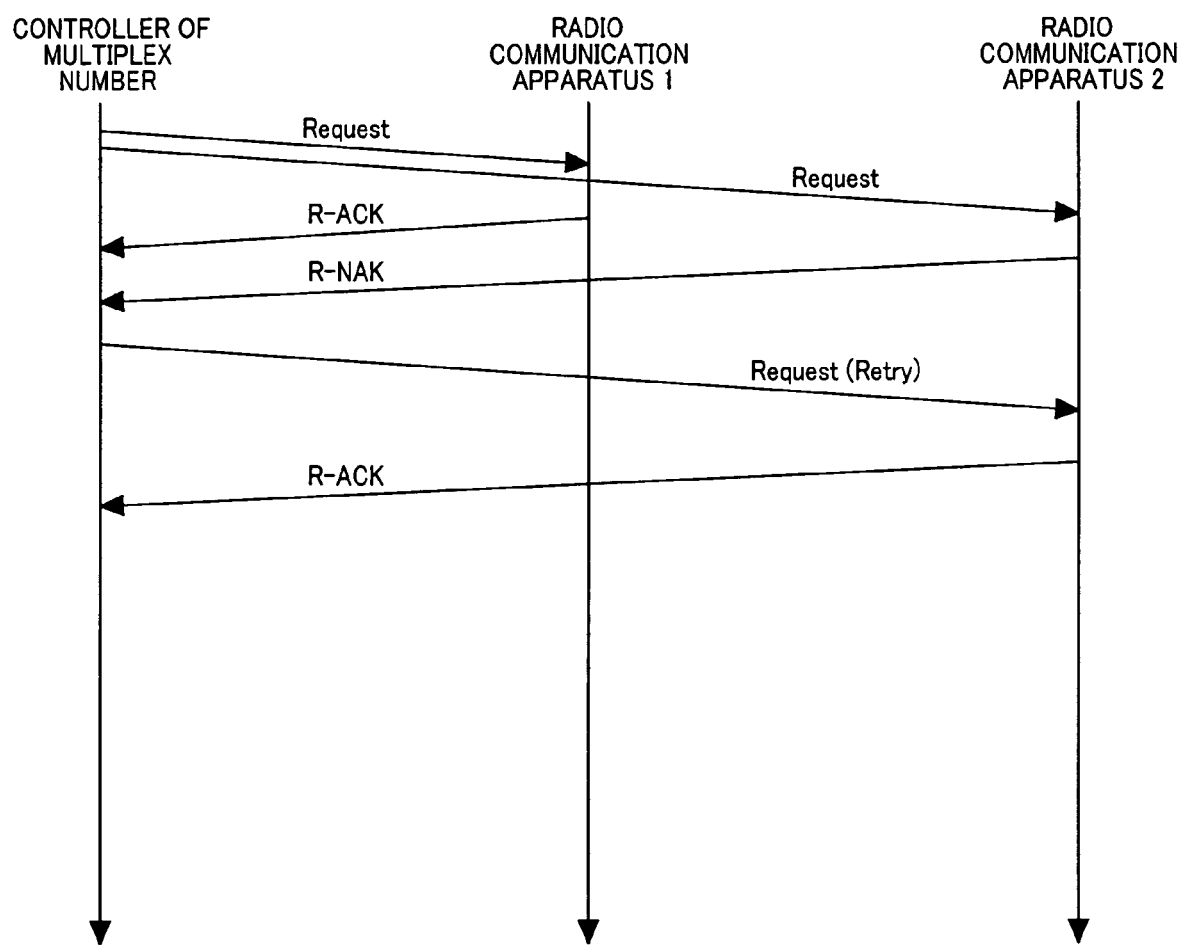
FIG. 19 illustrates a sequence of exchange of messages in which the controller of multiplex number in spatial domain requests the radio communication apparatuses to report the traffic representative values.

FIG. 19 is a diagram of sequence of exchange of messages when the controller of multiplex number in spatial domain requests the radio communication apparatuses to report the traffic representative values. First, the request transmission unit 107 of the controller of multiplex number in spatial domain transmits request messages (Request) to request reporting of the traffic representative values to the radio communication apparatuses. These message are received by the radio communication apparatuses and checked for an error by, for example, a parity check. If the message is not in error, the radio communication apparatus returns ACK (Request ACK, R-ACK) to the sender controller of multiplex number in spatial domain, as in an example of a reply from radio communication apparatus 1. If the message is in error, the radio communication apparatus returns NAK (Request NAK, R-NAK) to the sender controller of multiplex number in spatial domain, as in an example of a reply from radio communication apparatus 2. The request transmission unit 107 repeats retransmission until R-ACK is received from the radio communication apparatus.

Figure 20:
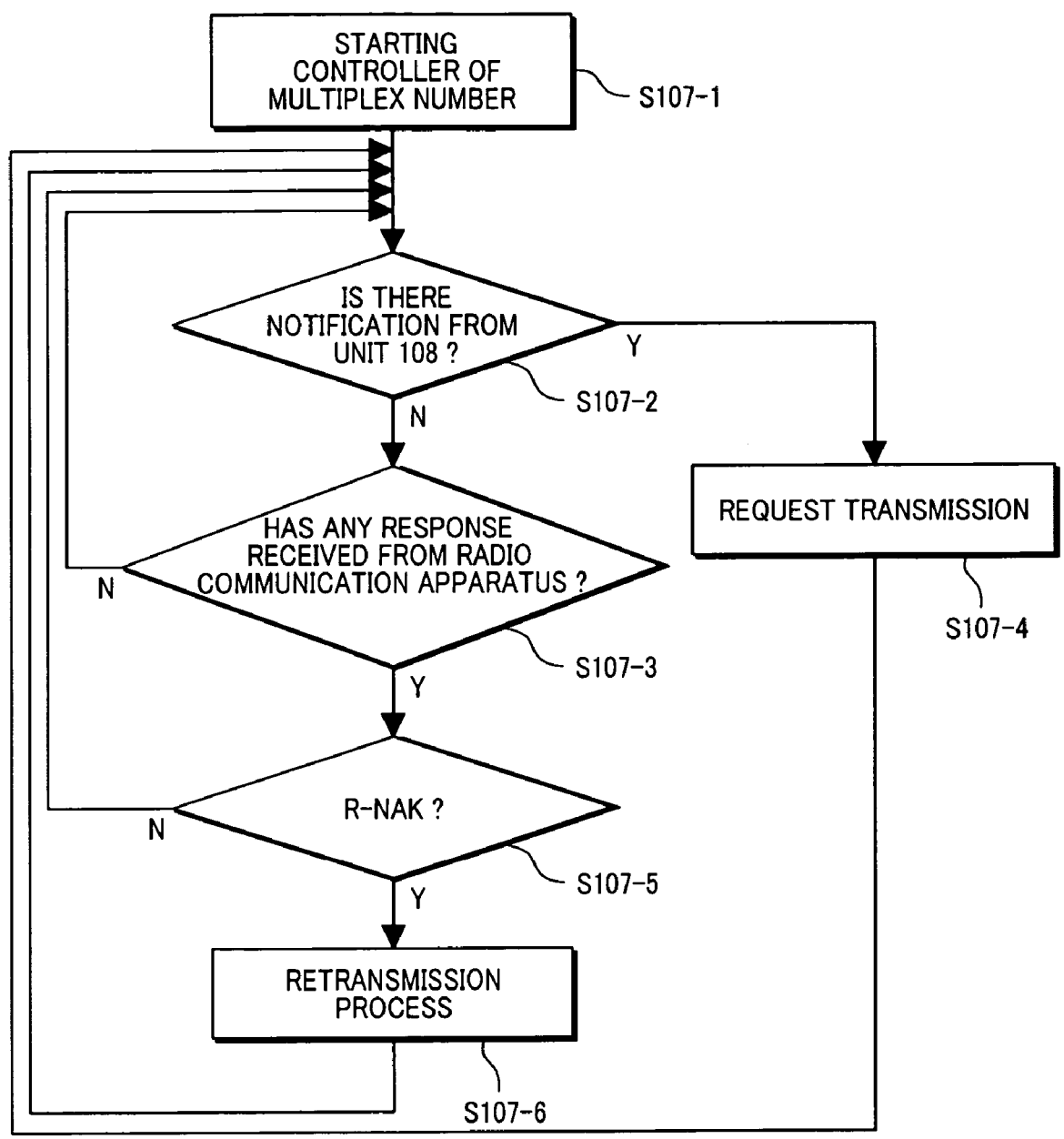
FIG. 20 is a flowchart of operation of a request transmission unit.

FIG. 20 shows a flowchart of operation of the request transmission unit 107. Upon the startup of the controller of multiplex number in spatial domain (S107-1), initially, the request transmission unit 107 waits for a trigger from the timer 108 (S107-2) or waits for a reply to a Request message from a radio communication apparatus (S107-3). When the request transmission unit 107 receives the trigger from the timer 108, it transmits request messages to the specified radio communication apparatuses. The apparatuses (request transmissions) to which the request messages should be transmitted are those radio communication apparatuses with the gathering information flag of 1 with reference to the records held in the list record unit 106 (for example, FIG. 13B), and the Request messages are transmitted to these apparatuses (S107-4). When the request transmission unit 107 receives a reply in response to a Request message from a radio communication apparatus, it determines whether the message is R-NAK (S107-5). If the message is R-NAK, the request transmission unit 107 retransmits a Request message to the radio communication apparatus (S107-6).

Figure 21:
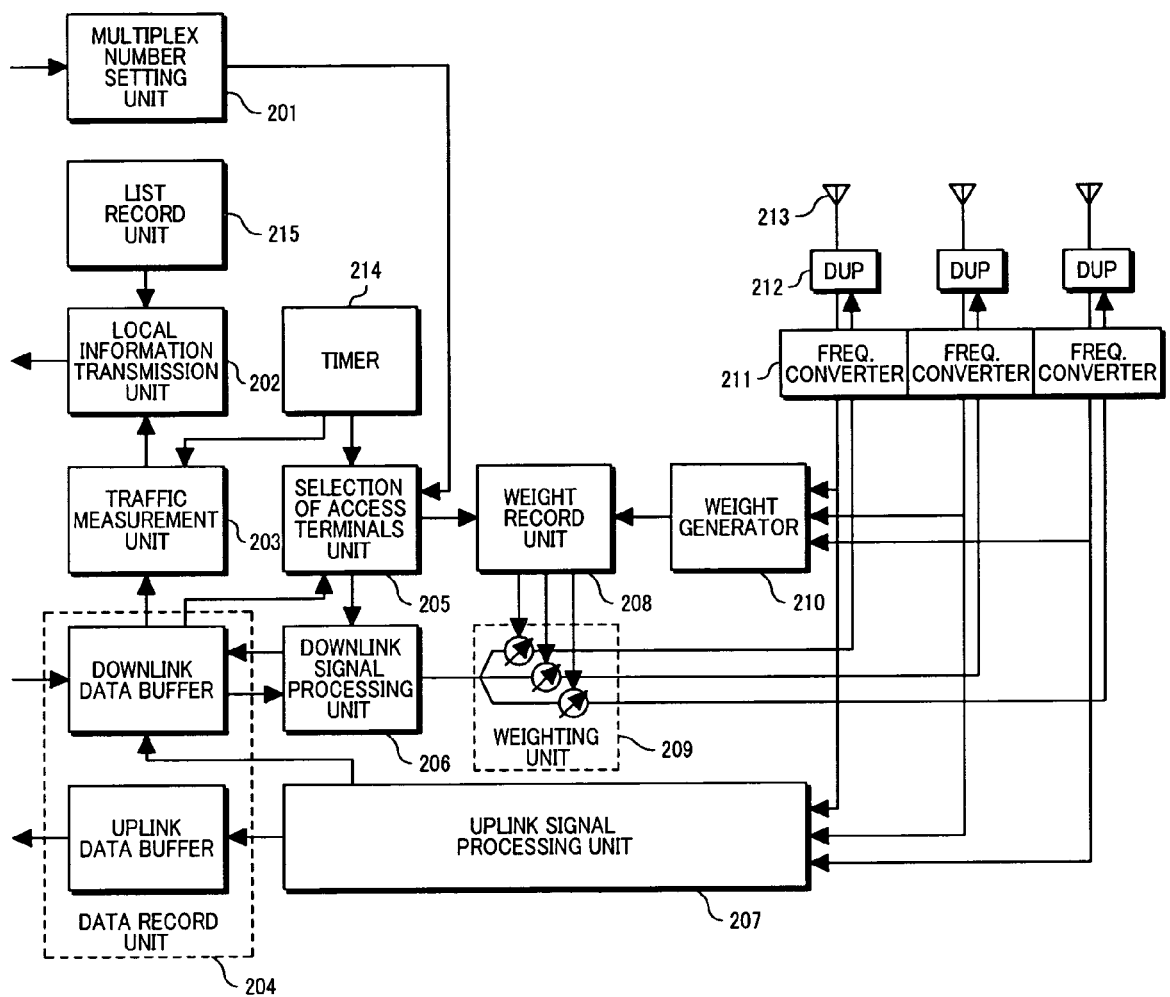
FIG. 21 illustrates a first configuration example of a radio communication apparatus.

FIG. 21 illustrates an example of a configuration of a radio communication apparatus. A multiplex number setting unit 201 receives a multiplex number notification message (M-Info) from the controller of multiplex number in spatial domain and notifies a terminal selecting unit 205 of the multiplex numbers allocated to the radio communication apparatus. The multiplex number setting unit 201 transmits a reply message to M-Info to the sender controller of multiplex number in spatial domain.

Triggered by the timer 214, the terminal selecting unit 205 selects terminals to be accommodated by the multiplex number specified from the multiplex number setting unit 201 among the terminals communicating by radio with the radio communication apparatus. At this time, terminals are selected so that one terminal will be accommodated by each directional beam. The identifiers of the selected terminals are notified to a downlink signal processing unit 206 and a weight record unit 208. When selecting terminals, because the terminal selecting unit 205 selects at least a terminal to which downlink data is to be transmitted (data more than 0 bit remains), it refers to a downlink data buffer of a data record unit 204. For example, selecting terminals is implemented by selecting those to be accommodated by the multiplex number among the terminals for which data more than 0 bit remains by the Round Robin method.

Based on the identifiers of the selected terminals notified from the terminal selecting unit 205, the downlink signal processing unit 206 reads data bit streams to the terminals from the downlink data buffer of the data record unit 204. The bit streams which have been read are processed by baseband signal processing, according to a protocol for communication with the terminals at the physical layer (for example, the document 1). The resulting signals of the baseband signal processing together with the terminal identifiers are written into an input signal buffer of a weighting unit 209.

The weight record unit 208 records array weights for downlink signals per terminal, generated by an array weight generator 210. Upon being notified of the terminal identifiers from the terminal selecting unit 205, the weight record unit 208 notifies the weighting unit 209 of the array weights per terminal identifier notified.

The weighting unit 209 distributes the baseband-processed signals written from the downlink signal processing unit 206 to the buffer into branches corresponding to antenna elements, multiplies the signals which are separately supplied to each antenna element by the appropriate array weights notified from the weight record unit 208, and generates the baseband signals weighted by array weight per antenna element. When multiplying the signals by the weights, the input baseband signals for a terminal identifier must be multiplied by the array weight for the terminal identifier.

The array weight generator 210 determines an array weight which is used for downlink to a terminal, based on uplink signals from the terminal and records the array weight with the terminal identifier into the weight record unit 208. The same array weight may be used for a plurality of terminals. For example, in a method in which M fixed beam patterns are available at a base station and different beams are allocated to segments of M/360 degrees, the array weight generator 210 estimates a direction in which uplink signals come from a terminal by a MUSIC algorithm (for example, R. O. Schmidt, "Multiple Emitter Location and Signal Parameter Estimation," IEEE Trans. AP-34, 1986), determines which segment of M/360 degrees in which the direction falls, selects one fixed beam pattern, and records the array weight to generate the fixed beam associated with the terminal identifier into the weight record unit 208.

Frequency converters 211 makes baseband to carrier band conversion for downlink baseband signals and carrier band to baseband conversion for uplink carrier band signals. Duplexers DUP 212 separate uplink signals and downlink signals.

An uplink signal processing unit 207 performs baseband signal processing on uplink signals converted to baseband, according to a protocol for communication with the terminals at the physical layer (for example, 3GPP2 C.S0024-A "cdma 2000 High Rate Packet Data Air Interface Specification" (pp. 13-7 to 13-41, 2004 Mar. 31)), converts the signals into bit streams, and records the bit streams with the terminal identifiers into an uplink signal buffer of the data record unit 204. The uplink signal processing unit 207 performs diversity combining of input signals through space diversity branches from a plurality of antenna elements.

The data record unit 204 stores bit streams (voice and data) from/to each terminal communicating by radio with the radio communication apparatus, both downlink and uplink bit streams into the buffers. The downlink bit streams are those transmitted from another radio communication apparatus or a gateway in the radio communication system to the radio communication apparatus. The uplink bit streams are transmitted from the radio communication apparatus to another radio communication apparatus or a gateway.

Triggered by the timer 214, a traffic measurement unit 203 determines a traffic representative value by referring to the downlink data buffer of the data record unit 204 and notifies an local information transmission unit 202 of the traffic representative value. The method of determining the traffic representative value will be described later.

The local information transmission unit 202 sends a notification of the traffic representative value notified from traffic measurement unit 203 to the specified controller(s) of multiplex number. The destination(s) of this notification is recorded in a list record unit 215.

FIG. 22 illustrates an example of contents of the downlink data buffer of the data record unit 204, observed by the traffic measurement unit 203. Information to be recorded into this buffer comprises, for each record, the identifier of a destination terminal, the number of bits which are not yet transmitted, and a bit stream. When the identifier of a terminal is specified from The downlink signal processing unit 206, a part or all of the bit stream associated with the identifier is read. The bit stream that has been read is deleted from the buffer and the bits constituting the stream are also subtracted. The number of bits to be read is defined, according to a protocol for communication with the terminals at the physical layer (for example, the document 1). Unless the protocol prescribes that the number of bits to be read be always fixed, it may be necessary for the downlink signal processing unit 206 to specify the number of bits to be read. When a bit stream is received from another radio communication apparatus or a gateway in the radio communication system, the number of bits and the bit stream are added to the buffer in accordance with the format shown in FIG. 22. The number of bits associated with a terminal 00000003 is 0 in FIG. 22. This means that a connection between the terminal and the radio communication apparatus is established, but there is no downlink data at this point of time.

Figure 23:
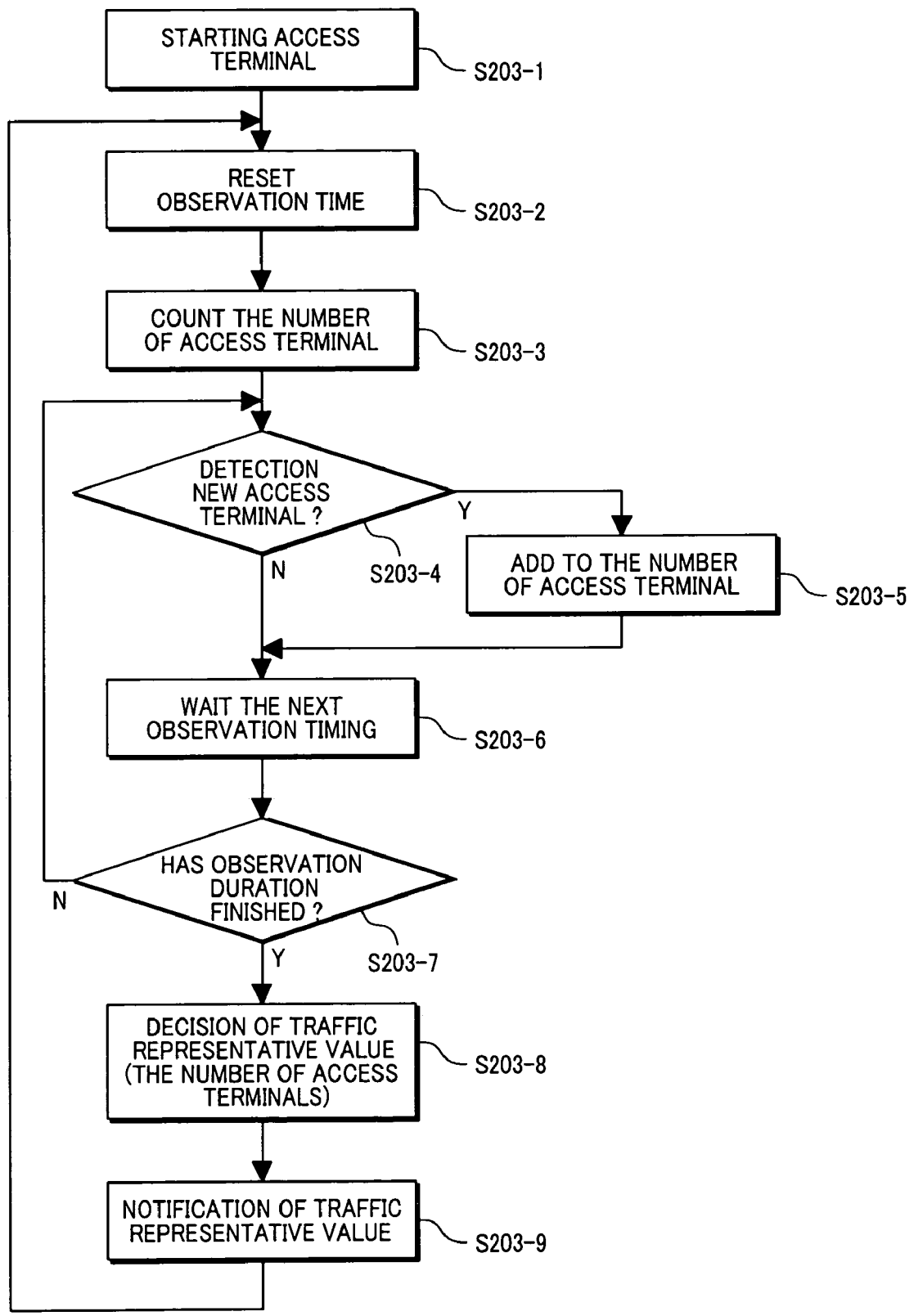
FIG. 23 is a flowchart of a first embodiment of operation of a traffic measurement unit.

FIG. 23 shows a flowchart of an example of operation of the traffic measurement unit 203. According to this flowchart, the traffic measurement unit 203 counts the number of terminals for which bits more than 0 have been stored at least once for even a moment into the downlink data buffer of the data record unit 204 during a given period of observation time and temporarily stores such terminal or terminals.

Upon the startup of the radio communication apparatus (S203-1), the observation time is reset (S203-2). When the observation time has been reset, the traffic measurement unit 203 counts the number of terminals for which the number of bits is more than 0 by referring to the downlink data buffer (FIG. 22) of the data record unit 204. Waiting for an interval of time at S203-6, the traffic measurement unit 203 checks the number of bits of each terminal in the downlink data buffer at intervals of a given period of time. If the number of bits has changed for at least one terminal, it checks whether there is a terminal not counted for which the number of bits is more than 0 against the temporary storage (S203-4). If a terminal not counted exists, the number of terminals for which the number of bits is more than 0 is incremented and the terminal is added to the temporary storage. The traffic measurement unit 203 repeats the steps from S203-4 to S203-6 until the end of the observation time (S203-7). At the end of the observation time, the traffic measurement unit 203 determines the number of terminals for which the number of bits is more than 0 as the traffic representative value (S203-8) and notifies the local information transmission unit 202 of that number (S203-9). When this notification has been finished, the temporary storage is cleared.

Figure 24:
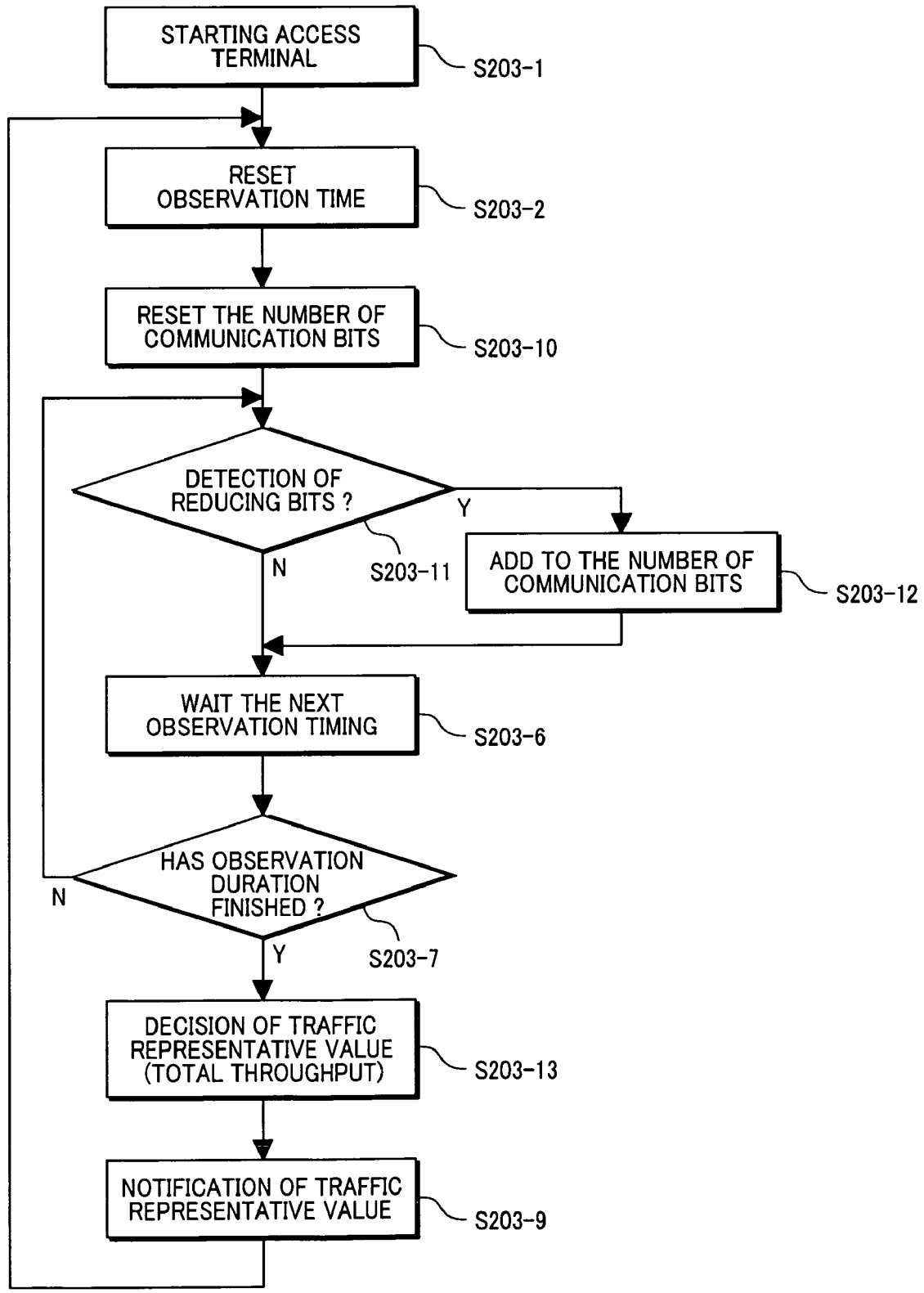
FIG. 24 is a flowchart of a second embodiment of operation of the traffic measurement unit.

FIG. 24 shows a flowchart of another example of operation of the traffic measurement unit 203. According to this flowchart, the traffic measurement unit 203 measures the total number of bits transmitted from the downlink data buffer of the data record unit 204 during a given period of observation time, that is, the throughput of the radio communication apparatus.

Upon the startup of the radio communication apparatus (S203-1), the observation time is reset (S203-2). When the observation time has been reset, the total number of bits transmitted by the radio communication apparatus is cleared (S203-10). Waiting for an interval of time at S203-6, the traffic measurement unit 203 checks the number of bits of each terminal in the downlink data buffer at intervals of a given period of time. If the number of bits has changed for at least one terminal (S203-11), the quantity of subtracted bits for all terminals for which the bits have been reduced is added to the total number of bits transmitted(S203-12). The traffic measurement unit 203 repeats the steps from S203-11 to S203-6 until the end of the observation time (S203-7). At the end of the observation time, the traffic measurement unit 203 determines the throughput of the radio communication apparatus by dividing the total number of bits by the observation time as the traffic representative value (S230-13) and notifies the local information transmission unit 202 of the throughput (S203-9).

Figure 25:
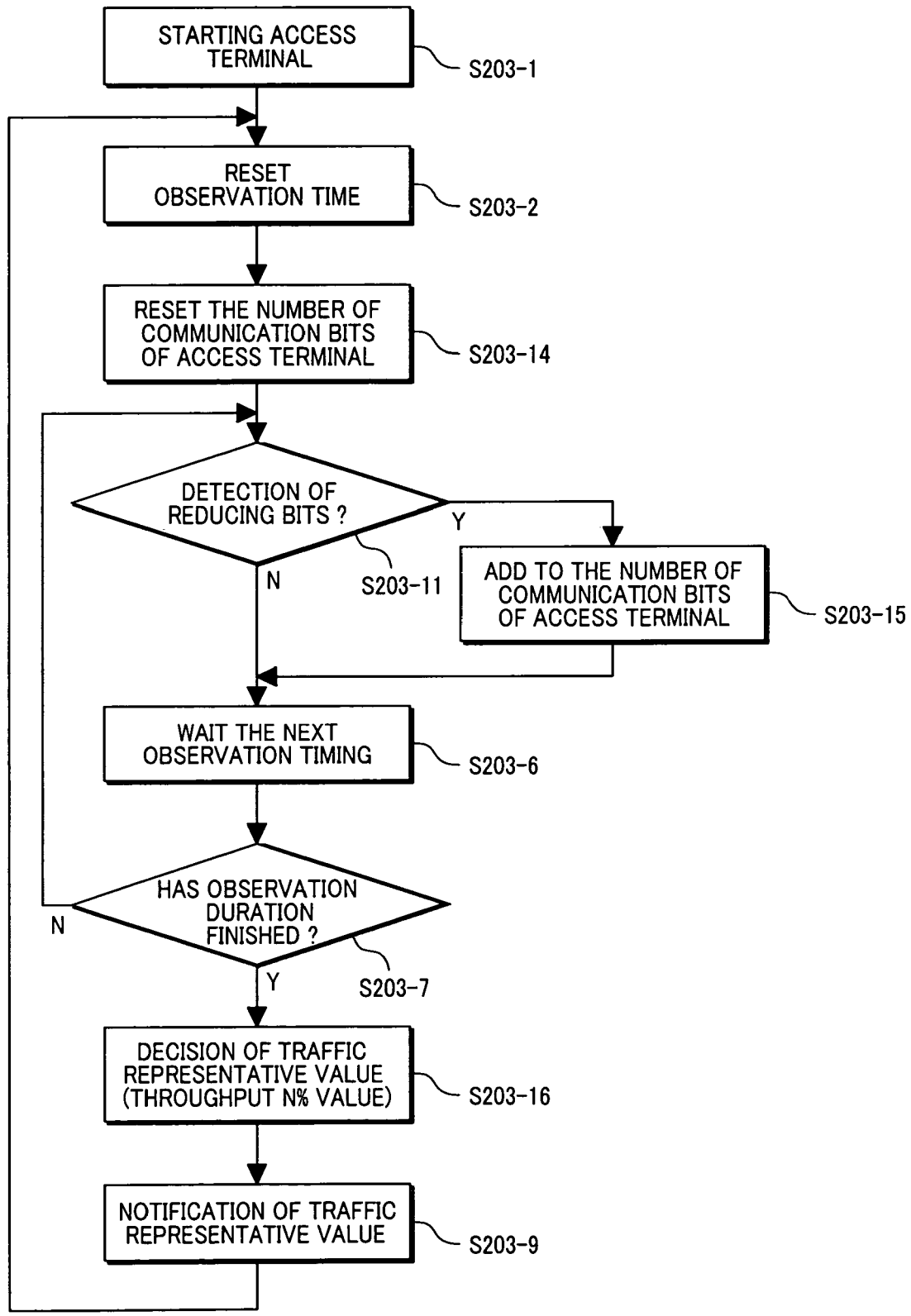
FIG. 25 is a flowchart of a third embodiment of operation of the traffic measurement unit.

FIG. 25 shows a flowchart of yet another example of operation of the traffic measurement unit 203. According to this flowchart, the traffic measurement unit 203 measures the total number of bits transmitted on a per-terminal basis from the downlink data buffer of the data record unit 204 during a given period of observation time, that is, the throughput on a per-terminal basis of the radio communication apparatus.

Upon the startup of the radio communication apparatus (S203-1), the observation time is reset (S203-2). When the observation time has been reset, a list of the bits transmitted to each terminal by the radio communication apparatus is cleared (S203-14). Waiting for an interval of time at S203-6, the traffic measurement unit 203 checks the number of bits of each terminal in the downlink data buffer at intervals of a given period of time. If the number of bits has changed for at least one terminal (S203-11), the quantity of subtracted bits for each terminal for which the bits are reduced is added to the list of the bits transmitted to each terminal (S203-15). The traffic measurement unit 203 repeats the steps from S203-11 to S203-6 until the end of the observation time (S203-7). At the end of the observation time, the traffic measurement unit 203 determines throughputs per terminal by dividing the bits transmitted to each terminal by the observation time and arranges the throughputs in descending order. It determines an N percent value of the terminal throughputs from the highest throughput as the traffic representative value (S203-13) and notifies the local information transmission unit 202 of that value (S203-9).

According to the sequence diagram of FIG. 7, the local information transmission unit 202 transmits a T-Info message conveying the traffic representative value to the controller of multiplex number in spatial domain. If receiving T-NAK from the controller of multiplex number in spatial domain, the local information transmission unit 202 retransmits T-Info.

Figure 26:
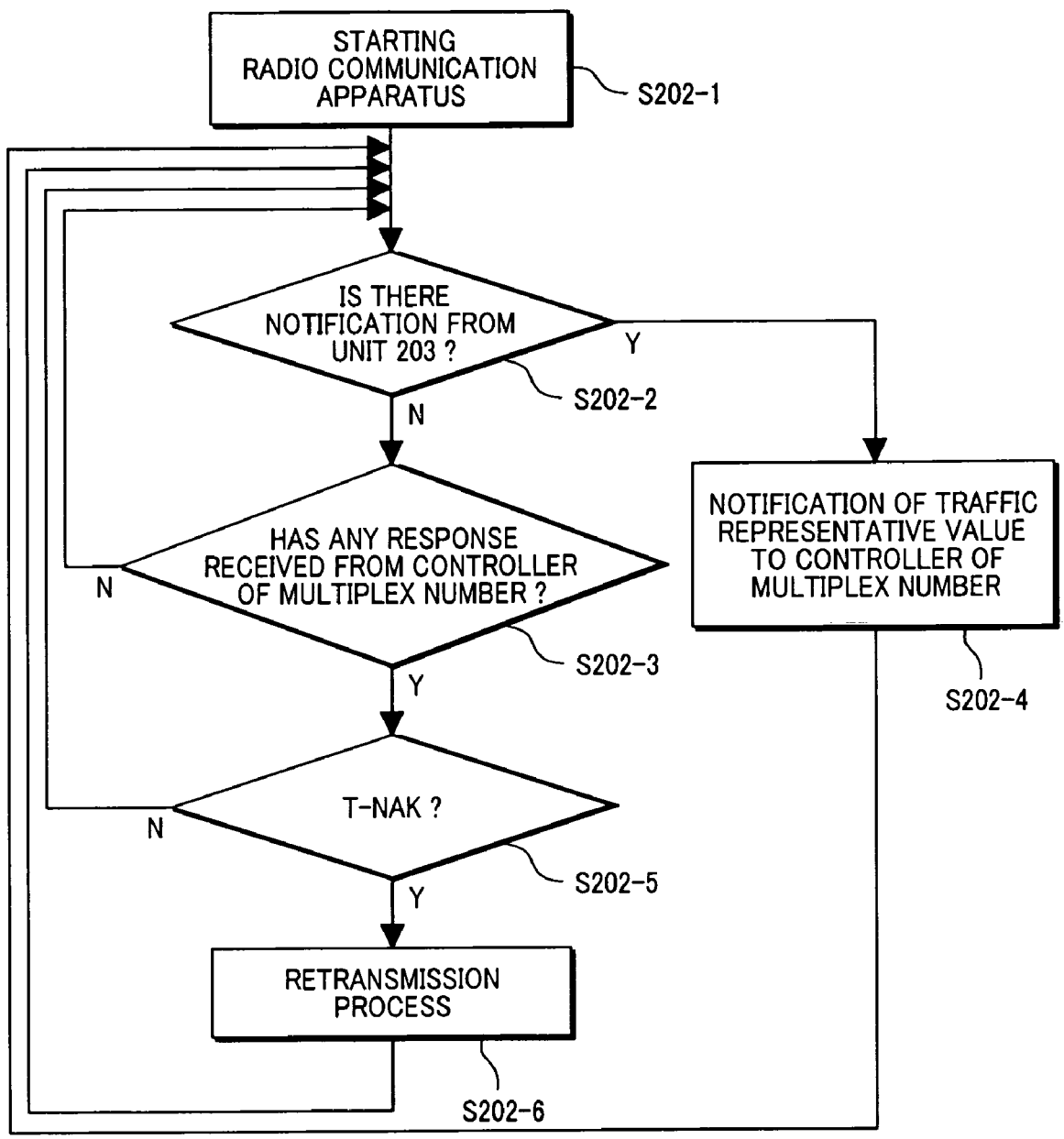
FIG. 26 is a flowchart of operation of a local information transmission unit.

FIG. 26 shows a flowchart of operation of the local information transmission unit 202. Upon the startup of the radio communication apparatus (S202-1), initially the local information transmission unit 202 waits for a trigger from the traffic measurement unit 203 (S202-2) or waits for a reply to a T-Info message from the controller of multiplex number in spatial domain (S202-3). Upon receiving the trigger from the traffic measurement unit 203, the local information transmission unit 202 sends a notification of the traffic representative value to the specified controller(s) of multiplex number (S202-4). This notification is sent to all controllers of multiplex number recorded in the list record unit 215. When the local information transmission unit 202 receives a reply to a T-Info message from the controller of multiplex number in spatial domain, it determines whether th message is T-NAK (S202-5). If the message is T-NAK, the local information transmission unit 202 retransmits a T-Info message to the controller of multiplex number in spatial domain (S202-6).

According to the sequence diagram of FIG. 16, the multiplex number setting unit 201 receives an M-Info message transmitted from the controller of multiplex number in spatial domain and checks for an error by, for example, a parity check. If the message is not in error, the multiplex number setting unit 201 returns M-ACK to the sender controller of multiplex number in spatial domain, as in an example of a reply from radio communication apparatus 1, and notifies the terminal selecting unit 205 of the multiplex numbers included in the received M-Info. If the message is in error, the multiplex number setting unit 201 returns M-NAK to the sender controller of multiplex number in spatial domain and requests retransmission of an M-Info message, as in an example of a reply from radio communication apparatus 2.

Figure 27:
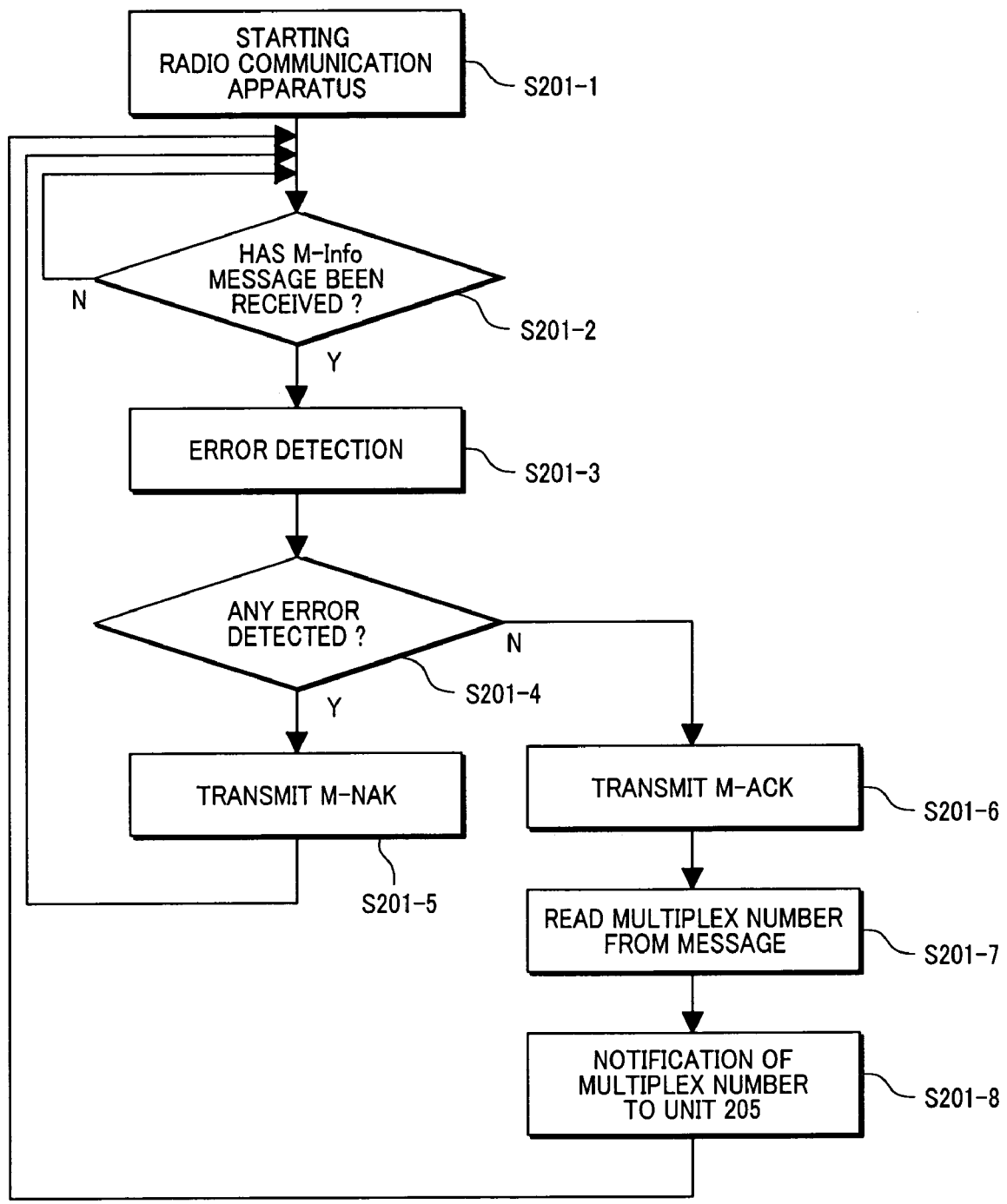
FIG. 27 is a flowchart of operation of a multiplex number setting unit.

FIG. 27 shows a flowchart of operation of the multiplex number setting unit 201. Upon the startup of the radio communication apparatus (S201-1), initially, the multiplex number setting unit 201 waits for an M-Info message from the controller of multiplex number in spatial domain (S201-2). Upon receiving the M-Info message, the multiplex number setting unit 201 detects whether the received message is in error (S201-3). If it is determined that the message is in error (S201-4), the multiplex number setting unit 201 returns M-NAK to the sender controller of multiplex number in spatial domain and requests retransmission of M-Info (S201-5). If the message is not in error, the multiplex number setting unit 201 returns M-ACK to the sender controller of multiplex number in spatial domain (S201-6), retrieves information (multiplex number in spatial domain) from the M-Info message (S201-7), and notifies the terminal selecting unit 205 of the multiplex number (S201-8).

Figure 28:
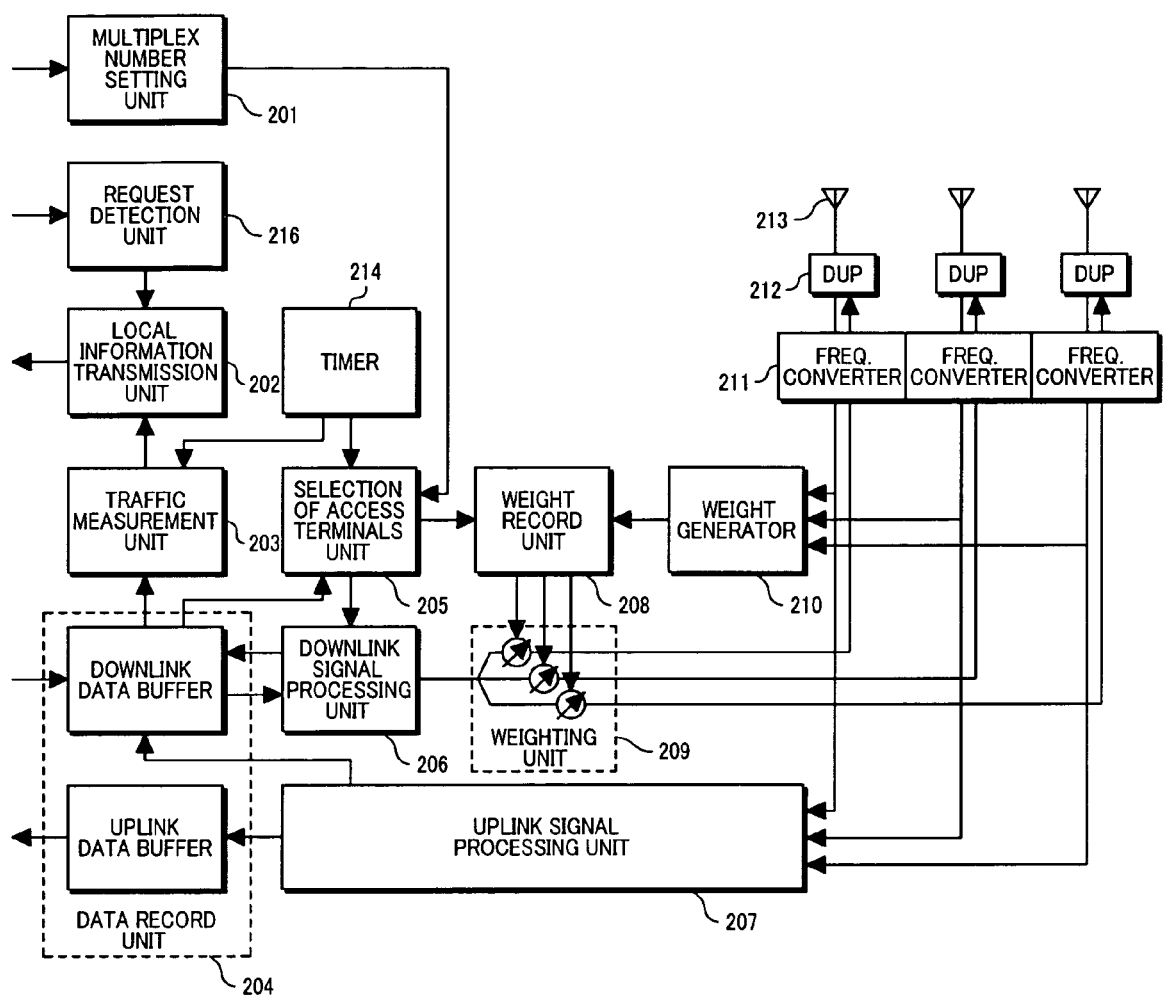
FIG. 28 illustrates a second configuration example of a radio communication apparatus.

FIG. 28 illustrates another example of a configuration of a radio communication apparatus. In this configuration, a request detection unit 216 is added to the foregoing configuration example, instead of the list record unit 215.

The request detection unit 216 triggers the local information transmission unit 202, when a Request message to request transmission of the traffic representative value has been received from the controller of multiplex number in spatial domain. In this configuration, the local information transmission unit 202 starts T-Info transmission operation upon receiving a trigger from the request detection unit 216. In the foregoing configuration example, it starts that operation upon receiving a trigger from the traffic measurement unit 203. In short, what triggers the transmission is different. The destination of T-info is the controller of multiplex number in spatial domain that is the sender of the request message in this configuration. There is a difference in this respect, because the destination of T-Info is determined by reference to the list record unit 215 in the foregoing configuration example.

According t the sequence diagram of FIG. 19, the request detection unit 216 receives a Request message transmitted from the controller of multiplex number in spatial domain and checks for an error by, for example, a parity check. If the message is not in error, the request detection unit 216 returns R-ACK to the sender controller of multiplex number in spatial domain, as in an example of a reply from radio communication apparatus 1, and notifies the local information transmission unit 202 of the reception of the request (by the trigger) and the identifier of the requesting controller of multiplex number in spatial domain. If the message is in error, the request detection unit 216 returns R-NAK to the sender controller of multiplex number in spatial domain, as in an example of a reply from radio communication apparatus 2.

Figure 29:
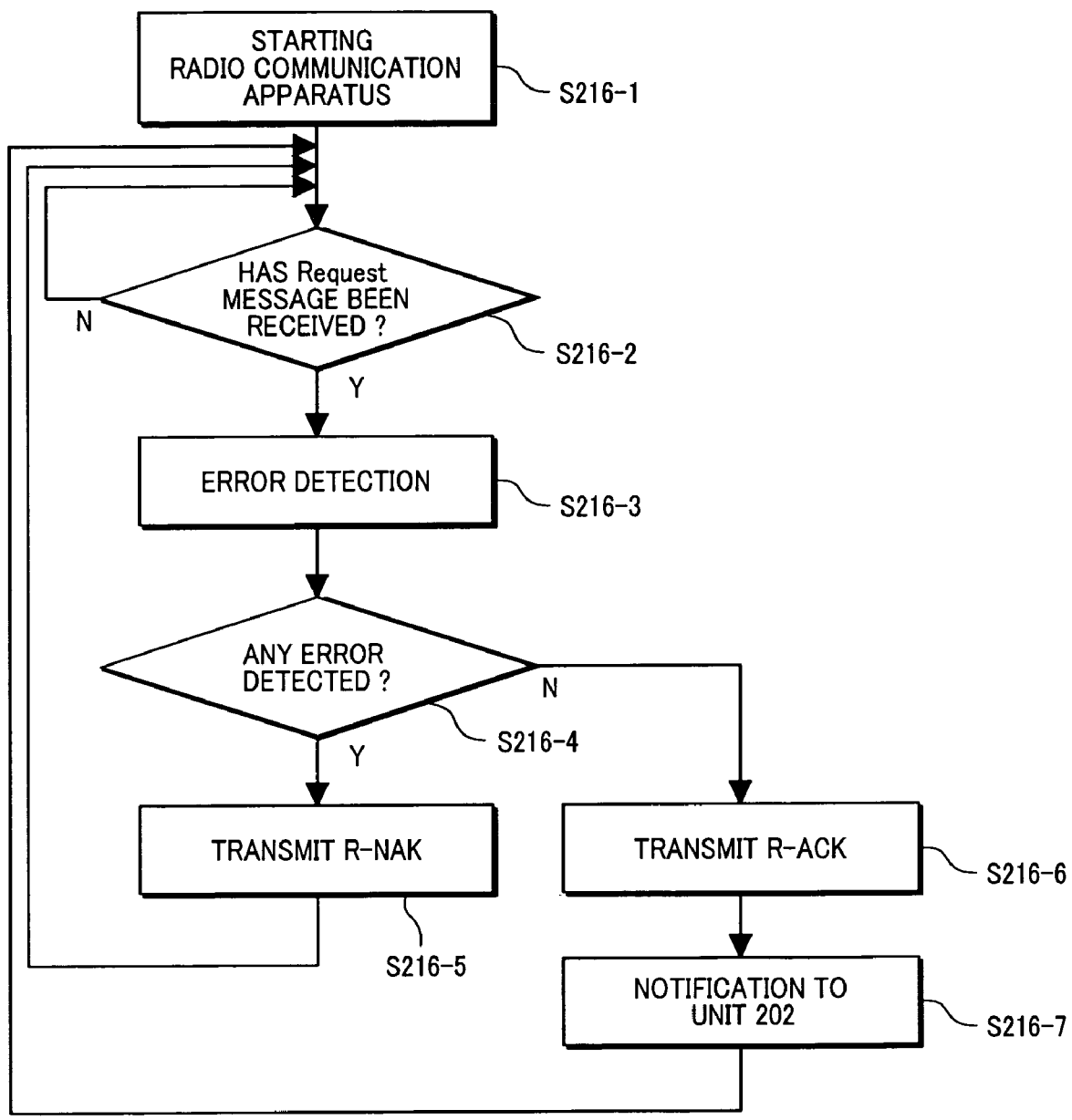
FIG. 29 is a flowchart of operation of request detection unit.

FIG. 29 shows a flowchart of operation of the request detection unit 216. Upon the startup of the radio communication apparatus (S216-1), initially, the request detection unit 216 waits for a Request message from the controller of multiplex number in spatial domain (S216-2). Upon receiving the Request message, the request detection unit 21 detects whether the received message is in error (S216-3). If it is determined that the message is in error (S216-4), the request detection unit 216 returns R-NAK to the sender controller of multiplex number in spatial domain and requests retransmission of the Request (S216-5). If the message is not in error, the request detection unit 216 returns R-ACK to the sender controller of multiplex number in spatial domain (S216-6) and notifies the local information transmission unit 202 of the reception of the request (by the trigger) and the identifier of the requesting controller of multiplex number in spatial domain (S216-7).

The operation of the local information transmission unit 202 basically follows the flowchart of FIG. 26. However, in this configuration example, because the local information transmission unit 202 is activated by a trigger from the request detection unit 216, the step S202-2 is changed to receiving a trigger from 216. The specified controller of multiplex number in spatial domain at S202-4 is the controller of multiplex number in spatial domain that is the sender of the Request message received by the request detection unit 216.

Figure 30:
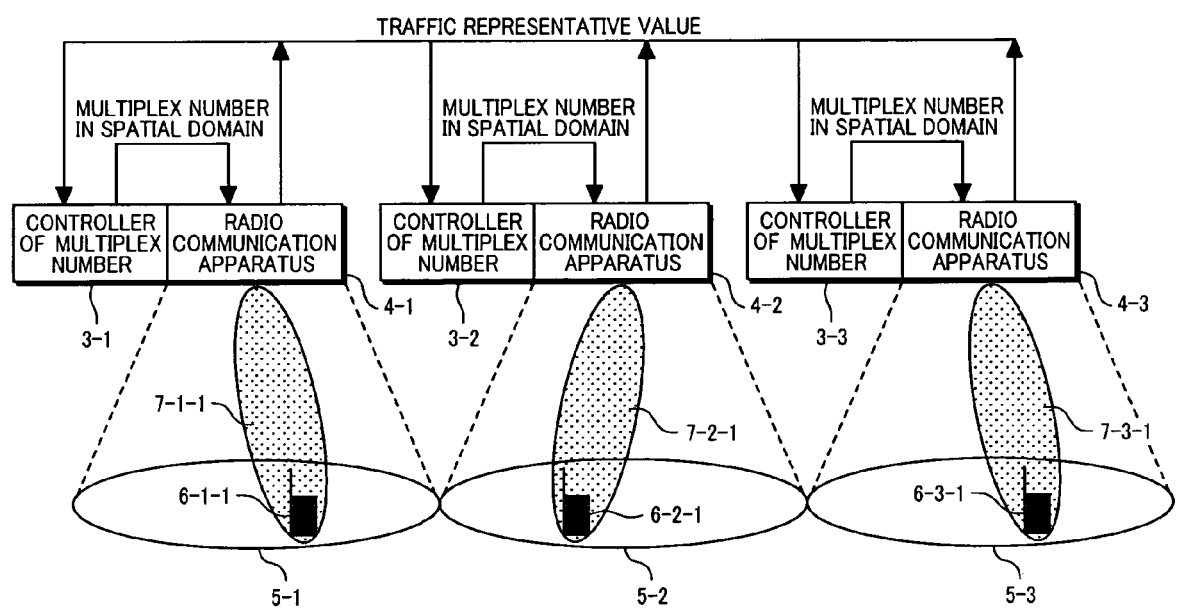
FIG. 30 illustrates a second embodiment of a system configuration according to the present invention.

FIG. 30 illustrates another example of a configuration of the present invention. Here, a controller 3 of multiplex number in spatial domain and an radio communication apparatus are regarded as an integral apparatus and each apparatus operates in an ad-hoc manner.

The controller 3 of multiplex number in spatial domain is connected to a plurality of radio communication apparatuses 4 via a network and takes a role of collecting traffic representative values from each radio communication apparatus 4, evaluating a plurality of traffic representative values, determining the multiplex number in spatial domain for each radio communication apparatus 4, and notifying a single radio communication apparatus 4 of the multiplex number in spatial domain. The radio communication apparatuses 4 transmit downlink signals to terminals 6, respectively, falling within geographical areas 5, using directional beams 7. The directional beams 7 as many as the multiplex number in spatial domain specified from the controller 3 of multiplex number in spatial domain are multiplexed and output, thereby spatial multiplex transmission to a plurality of terminals is performed. To allow the controller 3 of multiplex number in spatial domain to specify the multiplex number in spatial domain, each radio communication apparatus 4 observes downlink signals thereto, determines the traffic representative value, and transmits it to the controller 3 of multiplex number in spatial domain.

Difference from the configuration shown in FIG. 3 to FIG. 4 lies in whether multiplex number notification is sent to a plurality of destinations or a single destination.

The destinations of multiplex number notification are recorded in the list record unit 106 within the controller of multiplex number in spatial domain, for example, as shown in FIG. 13B. Here, If a plurality of radio communication apparatuses have the multiplex number decision flag of 1, the first embodiment is performed; if a single radio communication apparatus has this flag of 1, the second embodiment is performed. With the exception of this difference, the same ones can be used as the controller of multiplex number in spatial domain and radio communication apparatuses for the first embodiment shown in FIG. 5 to FIG. 20.

Figure 31:
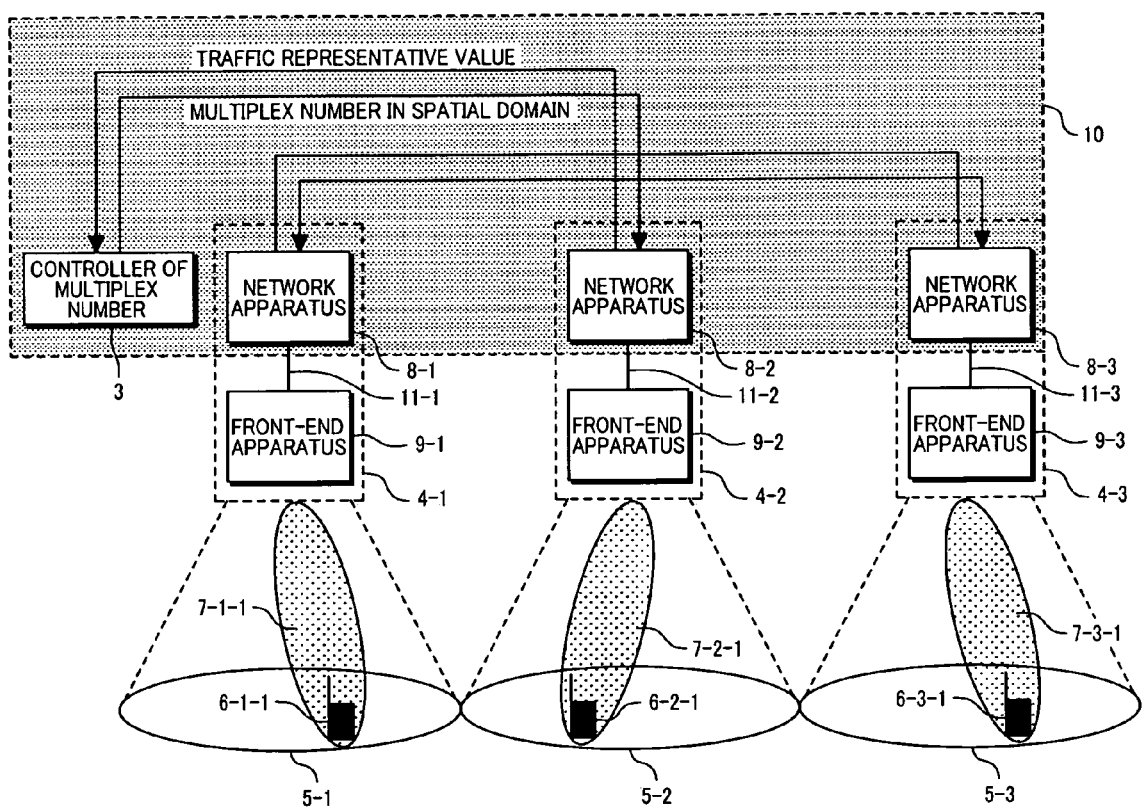
FIG. 31 illustrates a third embodiment of a system configuration according to the present invention.

FIG. 31 illustrates yet another example of a configuration of the present invention. Here is an ROF architecture (described, for example, Japanese Patent Application Laid-Open (JP-A) No. Hei 10-145286) in which a radio communication apparatus 4 is divided into a network apparatus 8 and a front-end apparatus 9 and network apparatuses 8 are geographically collected. The network apparatuses 8 and front-end apparatuses are connected by optical fibers 11. A feature of this configuration resides in that a controller 3 of multiplex number in spatial domain is installed near the network apparatuses 8, so that it will be easy to exchange information between the controller of multiplex number in spatial domain and each radio communication apparatus.

The controller 3 of multiplex number in spatial domain is connected to a plurality of radio communication apparatuses within a centralized control system 10 and takes a role of collecting traffic representative values from each radio communication apparatus 4, evaluating a plurality of traffic representative values, determining the multiplex number in spatial domain for each radio communication apparatus 4, and notifying each radio communication apparatus 4 of the multiplex number in spatial domain. The radio communication apparatuses 4 transmit downlink signals to terminals 6, respectively, falling within geographical areas 5, using directional beams 7. The directional beams 7 as many as the multiplex number in spatial domain specified from the controller 3 of multiplex number in spatial domain are multiplexed and output, thereby spatial multiplex transmission to a plurality of terminals is performed. To allow the controller 3 of multiplex number in spatial domain to specify the multiplex number in spatial domain, each radio communication apparatus 4 observes downlink signals thereto, determines the traffic representative value, and transmits it to the controller 3 of multiplex number in spatial domain.

As comparing this embodiment with the embodiment shown in FIGS. 3 and 4, the controller 3 of multiplex number in spatial domain exchanges information with the network apparatuses 8 instead of all radio communication apparatuses 4 and, therefore, the same controller of multiplex number in spatial domain as described above can be used. For the radio communication apparatuses 4, the internal structure is altered, but the interface with the controller 3 of multiplex number in spatial domain remains unchanged.

Figure 32:
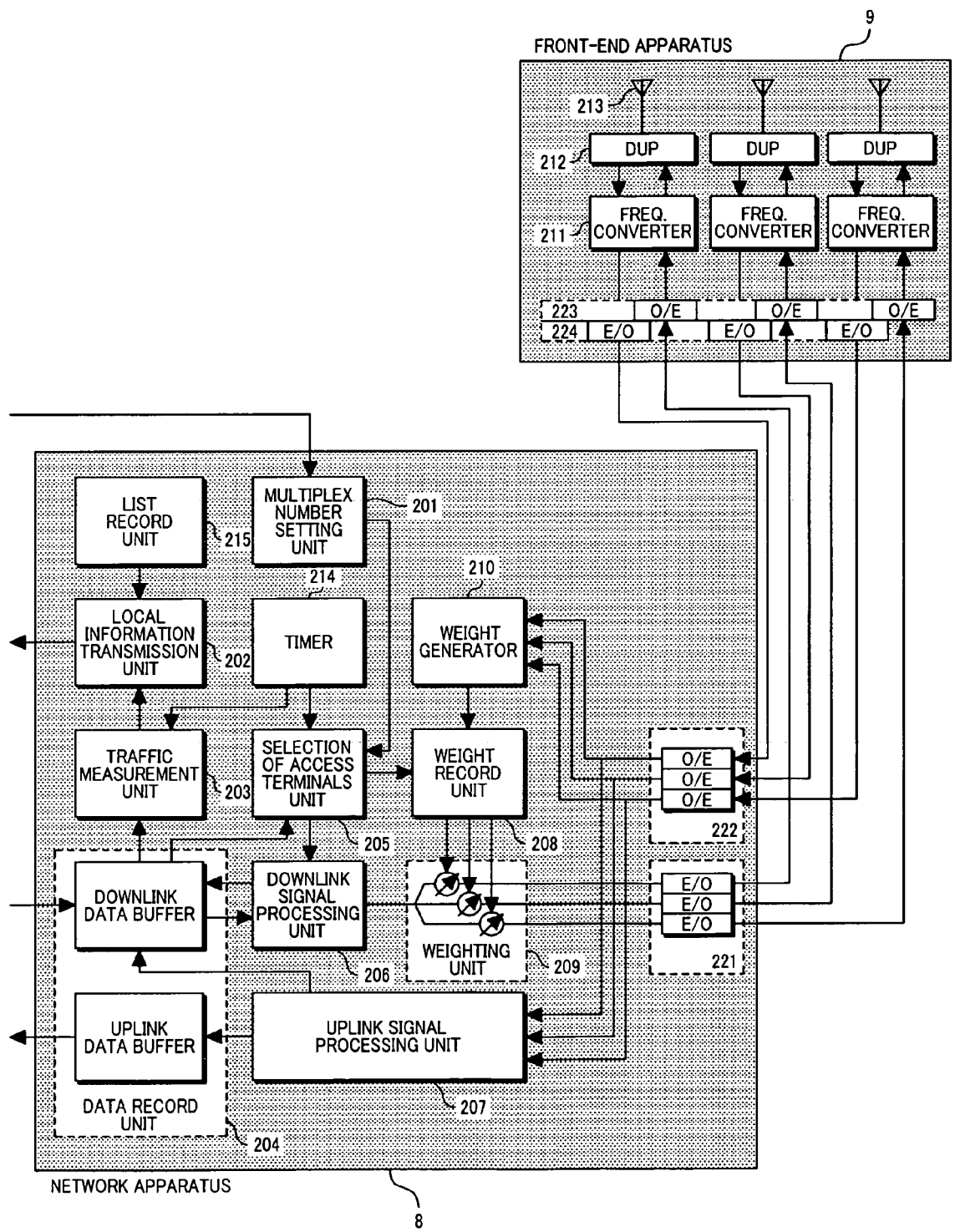
FIG. 32 illustrates a first configuration example of an ROF configuration radio communication apparatus according to the present invention.

FIG. 32 illustrates an example in which an ROF configuration radio communication apparatus is used in the present invention.

In this configuration, the radio communication apparatus configuration example shown FIG. 21 is divided into a network apparatus 8 and a front-end apparatus 9 and electrical/optical (E/O) converters (221) and optical/electrical (O/E) converters (222) are added to the network apparatus 8 and electrical/optical (E/O) converters (224) and optical/electrical (O/E) converters (223) are added to the front-end apparatus 9 as well. These electrical/optical converters and optical/electrical converters as many as the number of antenna elements 213 of the front-end apparatus 9 are provided. The electrical/optical (E/O) converters (221) of the network apparatus and the optical/electrical (O/E) converters (223) of the front-end apparatus are connected by optical fibers. The optical/electrical (O/E) converters (222) of the network apparatus 8 and the electrical/optical (E/O) converters (224) of the front-end apparatus 9 are also connected by optical fibers. As compared with the configuration example shown in FIG. 21, the present embodiment is characterized by change from electrical to optical means for communication between the frequency converters 211 and the array weight generator 210 and the uplink signal processing unit 207, but the operation of each constituent part is the same. Therefore, this ROF configuration radio communication apparatus operates in the same way as the radio communication apparatus of the configuration example shown in FIG. 21.

The radio communication apparatuses and the controller of multiplex number in spatial domain of the present invention control the multiplex number in spatial domain for each radio communication apparatus, taking account of the traffic conditions of multiple radio communication apparatuses in a spatial multiplex system. The invention is generally applicable to radio communication systems where a network is formed by multiple radio communication apparatuses which perform spatial multiplex communication and is suitable for a cellar system where traffic conditions are liable to vary across geographical areas. Furthermore, the ROF configuration of the radio communication apparatus makes it easy to realize the present invention.

What is claimed is:

1. In a radio communication system where there are a plurality of sets of radio communication apparatuses that perform spatial multiplex transmission to one or a plurality of terminals and geographical areas where communication with one of the radio communication apparatuses is possible, the radio communication apparatuses being interconnected via a network, a controller of multiplex number in spatial domain that controls the multiplex number in spatial domain of each radio communication apparatus, comprising:

a traffic information gathering unit which collects traffic representative values indicating traffic conditions of each of the radio communication apparatuses, the traffic representative values including the number of terminals communicating with each radio communication apparatus;

a traffic record unit which records the traffic representative values and values of the multiplex number in spatial domain for each of the radio communication apparatuses;

a traffic evaluation unit which evaluates the traffic representative value of each radio communication apparatus, based on the traffic representative values of a plurality of radio communication apparatuses;

a multiplex number decision unit which determines a value or values of the multiplex number or multiplex numbers in spatial domain for one or a plurality of radio communication apparatuses according to the number of terminals communicating with each radio communication apparatus included in the traffic representative values; and a multiplex number notification unit which notifies each radio communication apparatus of the multiplex number in spatial domain determined by the multiplex number decision unit.

2. The controller of multiplex number in spatial domain according to claim 1, wherein the traffic information gathering unit receives the traffic representative values and the values of the multiplex number in spatial domain transmitted from each radio communication apparatus and records the traffic representative values and the values of the multiplex number in spatial domain into the traffic record unit.

3. The controller of multiplex number in spatial domain according to claim 1, further comprising:

a list record unit which records a list of radio communication apparatuses to be controlled by the controller of multiplex number in spatial domain; and message requesting provision of the traffic representative value and the multiplex number in spatial domain for each radio communication apparatus to a part or all of the radio communication apparatuses recorded in the list record unit.

4. The controller of multiplex number in spatial domain according to claim 1, wherein the traffic evaluation unit executes approximation calculation on the traffic representative values and the values of the multiplex number in spatial domain of the plurality of radio communication apparatuses collected by the traffic information gathering unit to obtain linear approximation in which the traffic representative values will be proportional to the values of the multiplex number in spatial domain and notifies the multiplex number decision unit of a linear approximation expression as a result of the calculation.

5. The controller of multiplex number in spatial domain according to claim 4, wherein the multiplex number decision unit determines the multiplex number in spatial domain corresponding to the traffic representative value with the least error from the linear approximation expression for each radio communication apparatus and records the determined multiplex number in spatial domain into the traffic record unit.

6. The controller of multiplex number in spatial domain according to claim 4, wherein the multiplex number decision unit reads the multiplex number in spatial domain and the traffic representative value of each radio communication apparatus from the traffic record unit and, for a radio communication apparatus for which an error of the traffic representative value from its approximate value on the linear approximation expression in relation to the multiplex number exceeds a threshold, increments or decrements the multiplex number by one, and records the determined multiplex number in spatial domain into the traffic record unit.

7. The controller of multiplex number in spatial domain according to claim 1, further comprising a list record unit which records a list of radio communication apparatuses to be controlled by the controller of multiplex number in spatial domain, wherein the list record unit manages identifiers for uniquely identifying the radio communication apparatuses, flags to specify radio communication apparatuses from which the controller of multiplex number in spatial domain is to collect the traffic representative values, and flags to specify radio communication apparatuses for which the controller of multiple number is to determine the multiplex number in spatial domain.

8. The controller of multiplex number in spatial domain according to claim 1,
further comprising a list record unit which records a list of radio communication apparatuses to be controlled by the controller of multiplex number in spatial domain,
radio communication apparatuses to be controlled by the controller of the multiplex number in spatial domain determined for each radio communication apparatus.

9. In a radio communication system where there are a plurality of sets of radio communication apparatuses that perform spatial multiplex transmission to one or a plurality of terminals and geographical areas where communication with one of the radio communication apparatuses is possible, the radio communication apparatuses being interconnected via a network, a radio communication apparatus comprising:
a data record unit which temporarily records downlink bit streams and uplink bit streams per terminal communicating by radio with the radio communication unit;
a terminal selecting unit which selects only the number of terminals to be accommodated by the multiplex number in spatial domain determined per radio communication apparatus;
a downlink signal processing unit which reads downlink bit streams for the terminals selected by the terminal selecting unit from the data record unit and performs baseband signal processing on the bit streams;
a weight record unit which records array weights for generating directional transmission beams which are used for downlink communication, wherein the array weights are associated with terminals for which the array weights are used;
a weighting unit which, for baseband-processed signals to be transmitted to the selected terminals, reads the array weights of those terminals from the weight record unit and weights the signals by the array weights per antenna element;
frequency converters which converts baseband and carrier center frequency for downlink signals and reverse conversion for uplink signals;
an array weight generator which determines the directional transmission beams to be used for downlink, based on uplink signals from terminals, and records array weights corresponding to the beams into the weight record unit; and
an uplink signal processing unit which performs baseband signal processing on uplink signals from terminals, thereby converting the signals into bit streams, and records the bit streams into the data record unit,
the radio communication apparatus further including:
a traffic measurement unit which performs traffic representative value measurement on the radio communication apparatus;
a local information transmission unit which transmits the traffic representative value to the controller of multiplex number in spatial domain; and
a multiplex number setting unit which determines the multiplex number in spatial domain of the radio communication apparatus, as specified from the controller of multiplex number in spatial domain.

10. The radio communication apparatus according to claim 9, further comprising a request detection unit which waits for a message requesting transmission of the traffic representative value from the controller of multiplex number in spatial domain,
wherein the local information transmission unit is activated, triggered by receiving the request message, and transmits the traffic representative value to the requesting controller of multiplex number in spatial domain.

11. The radio communication apparatus according to claim 9, further comprising a list record unit which records a list of controller(s) of multiplex number in spatial domain as destination(s) to which the traffic representative value is to be transmitted,
wherein the radio communication apparatus transmits the traffic representative value to the controller(s) of multiplex number in spatial domain recorded in the list.

12. The radio communication apparatus in which the data record unit, the terminal selecting unit, the downlink signal processing unit, the weight record unit, the weighting unit, the frequency converters, the array weight generator, and the uplink signal processing unit, recited in claim 9, are functionally divided into a front-end apparatus and a network apparatus, and the front-end apparatus and the network apparatus are installed geographically away from each other, the network apparatus including:
a traffic measurement unit which performs traffic representative value measurement on the radio communication apparatus;
a local information transmission unit which transmits the traffic representative value to the controller of multiplex number in spatial domain; and
a multiplex number setting unit which determines the multiplex number in spatial domain of the radio communication apparatus, as specified from the controller of multiplex number in spatial domain.

13. The radio communication apparatus according to claim 12,
wherein the network apparatus includes a request detection unit which waits for a message requesting transmission of the traffic representative value from the controller of multiplex number in spatial domain, and
wherein the local information transmission unit is activated, triggered by receiving the request message, and transmits the traffic representative value to the requesting controller of multiplex number in spatial domain.

14. The radio communication apparatus according to claim 12,
wherein the network apparatus includes a list record unit which records a list of controller(s) of multiplex number as destination(s) to which the traffic representative value is to be transmitted, and
wherein the radio communication apparatus transmits the traffic representative value to the controller(s) of multiplex number recorded in the list.

15. The radio communication apparatus according to claim 9, wherein the traffic measurement unit comprises a traffic observation unit which observes downlink bit streams per terminal recorded in the data record unit for a given period of time, an observation results record unit which records the number of terminals communicating with the radio communication apparatus and bit flow rates per terminal as results of the observation, and a representative value determination unit which determines the traffic representative value from the results of the observation.

16. The radio communication apparatus according to claim 15, wherein the representative value determination unit determines the number of terminals for which bits more than 0 have been observed as a downlink bit stream at least once for even a moment during a given period of time as the traffic representative value.

17. The radio communication apparatus according to claim 15, wherein the representative value determination unit counts the total number of subtracted bits of the downlink bit streams for all terminals during a given period of time and determines a throughput obtained by dividing the total number of the subtracted bits by a given period of time as the traffic representative value.

18. The radio communication apparatus according to claim 15, wherein the representative value determination unit counts the number of subtracted bits of the downlink bit streams per terminal for the give period of time, calculates terminal throughputs by dividing the number of the subtracted bits per terminal by a given period of time, arranges all the terminal throughputs in descending order, and determines an N percent value (N is a real number that is more 0 and less than 100 ) of the terminal throughputs as the traffic representative value.

* * * * *

UNITED STATES PATENT AND TRADEMARK OFFICE
CERTIFICATE OF CORRECTION

PATENT NO.       : 7,620,002 B2                                        Page 1 of 1
APPLICATION NO.  : 11/386946
DATED            : November 17, 2009
INVENTOR(S)      : Fujishima et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 648 days.

Signed and Sealed this

Twenty-sixth Day of October, 2010

David J. Kappos
*Director of the United States Patent and Trademark Office*